US012722149B2

(12) United States Patent
Kuk et al.

(10) Patent No.: US 12,722,149 B2
(45) Date of Patent: Sep. 1, 2026

(54) ORGANIC-INORGANIC COMPOSITE CATALYST, AIR PURIFICATION DEVICE INCLUDING THE ORGANIC-INORGANIC COMPOSITE CATALYST, AND METHOD OF REGENERATING THE ORGANIC-INORGANIC COMPOSITE CATALYST

(71) Applicants: Samsung Electronics Co., Ltd., Suwon-si (KR); jk global co., ltd., Hwaseong-si (KR)

(72) Inventors: Sukeun Kuk, Suwon-si (KR); Taehun Yeon, Ansan-si (KR); Hyun Chul Lee, Suwon-si (KR); Minseok Koo, Suwon-si (KR); Hyukjae Kwon, Suwon-si (KR); Dongsik Yang, Suwon-si (KR); Sehyeong Oh, Suwon-si (KR); Sangmin Ji, Suwon-si (KR); Hyeonsu Heo, Suwon-si (KR)

(73) Assignees: SAMSUNG ELECTRONICS CO., LTD., Gyeonggi-Do (KR); JK GLOBAL CO., LTD., Hwaseong-si (KR)

( * ) Notice: Subject to any disclaimer, the term of this patent is extended or adjusted under 35 U.S.C. 154(b) by 483 days.

(21) Appl. No.: 18/450,484

(22) Filed: Aug. 16, 2023

(65) Prior Publication Data

US 2024/0066515 A1 Feb. 29, 2024

(30) Foreign Application Priority Data

Aug. 29, 2022 (KR) ........................ 10-2022-0108726

(51) Int. Cl.
*B01J 38/00* (2006.01)
*B01J 21/18* (2006.01)
(Continued)

(52) U.S. Cl.
CPC ............... *B01J 38/02* (2013.01); *B01J 21/18* (2013.01); *B01J 23/34* (2013.01); *B01J 31/0249* (2013.01)

(58) Field of Classification Search
CPC ... B01J 38/02; B01J 21/18; B01J 23/34; B01J 31/0249
(Continued)

(56) References Cited

U.S. PATENT DOCUMENTS 11,203,009 B2 * 12/2021 Weinberger .......... B01J 37/0201
2019/0232254 A1 8/2019 Weinberger et al.

FOREIGN PATENT DOCUMENTS

JP 1996112516 A 5/1996
JP 3540964 B2 4/2004
(Continued)

*Primary Examiner* — James E Mcdonough
(74) *Attorney, Agent, or Firm* — CANTOR COLBURN LLP

(57) ABSTRACT

An organic-inorganic composite catalyst wherein the organic-inorganic composite catalyst includes a porous carbonaceous particle, a first compound; and a metal oxide particle, wherein the first compound and the metal oxide particle are supported on the porous carbonaceous particle, the first compound contains a polar functional group, an anion, or a combination thereof, the metal oxide is represented by the formula $M_aO_b$, wherein $0<a\leq4$, $0<b\leq5$, and M is a metal of Groups 2 to 16 of the Periodic Table of Elements, or a combination thereof, and the organic-inorganic composite catalyst is configured to remove a second compound from an unpurified air flow including the second compound.

20 Claims, 19 Drawing Sheets

(51) Int. Cl.

| | |
|---|---|
| ***B01J 23/34*** | (2006.01) |
| ***B01J 31/02*** | (2006.01) |
| ***B01J 38/02*** | (2006.01) |

(58) Field of Classification Search
USPC .......................................................... 502/56
See application file for complete search history.

(56) References Cited

FOREIGN PATENT DOCUMENTS

| | | | |
|---|---|---|---|
| KR | 100817440 | B1 | 3/2008 |
| KR | 100932949 | B1 | 12/2009 |
| KR | 101337207 | B1 | 12/2013 |
| KR | 20210061611 | A | 5/2021 |
| KR | 20210094307 | A | 7/2021 |

* cited by examiner

ORGANIC-INORGANIC COMPOSITE CATALYST, AIR PURIFICATION DEVICE INCLUDING THE ORGANIC-INORGANIC COMPOSITE CATALYST, AND METHOD OF REGENERATING THE ORGANIC-INORGANIC COMPOSITE CATALYST

CROSS-REFERENCE TO RELATED APPLICATION

This application is based on and claims priority to Korean Patent Application No. 10-2022-0108726, filed on Aug. 29, 2022, in the Korean Intellectual Property Office, and all the benefits accruing therefrom under 35 U.S.C. § 119, the content of which is incorporated by reference herein in its entirety.

BACKGROUND

1. Field

The disclosure relates to an organic-inorganic composite catalyst, an air purification device including the organic-inorganic composite catalyst, and a method of regenerating the organic-inorganic composite catalyst.

2. Description of the Related Art

In order to remove pollutants included in air, a porous material with a large specific surface area, or a photocatalyst is used to decompose pollutants.

For example, activated carbon with a large specific surface area is used as a porous material. The photocatalyst that decomposes the pollutants uses a separate light source and energy. There remains a need for an improved catalyst for air purification.

SUMMARY

Provided is an organic-inorganic composite catalyst that may easily regenerate and provide high removal capacity for polar compounds by having a new structure.

Provided is an air purification device that may include the organic-inorganic composite catalyst.

Provided is a method of regenerating the organic-inorganic composite catalyst.

Additional aspects will be set forth in part in the description which follows and, in part, will be apparent from the description, or may be learned by practice of the presented embodiments of the disclosure.

According to an aspect of the disclosure, an organic-inorganic composite catalyst includes: a porous carbonaceous particle; a first compound; and a metal oxide particle, wherein the first compound and the metal oxide particle are supported on the porous carbonaceous particle, the first compound includes a polar functional group, an anion, or a combination thereof, the metal oxide is represented by the formula $M_aO_b$, wherein $0<a\leq4$, $0<b\leq5$, and M is a metal of Groups 2 to 16 of the Periodic Table of Elements, or a combination thereof, and the organic-inorganic composite catalyst is configured to remove a second compound from an unpurified air flow including the second compound.

According to another aspect of the disclosure, an air purification device includes a housing, and the organic-inorganic composite catalyst, a regenerated organic-inorganic composite catalyst, or a combination thereof, in the housing, wherein the regenerated organic-inorganic composite catalyst may be a heat-treatment product of the organic-inorganic composite catalyst including the adsorbed second compound.

According to another aspect of the disclosure, a method of regenerating an organic-inorganic composite catalyst includes: providing an organic-inorganic composite catalyst including an adsorbed second compound, and heat-treating the organic-inorganic composite catalyst including the adsorbed second compound to regenerate the organic-inorganic composite catalyst, wherein the regenerated organic-inorganic composite catalyst includes a porous carbonaceous particle, a first compound, and a metal oxide particle, wherein the first compound and the metal oxide particle are supported on the porous carbonaceous particle, the first compound includes a polar functional group, an anion, or a combination thereof, and the metal oxide may be represented by the Formula $M_aO_b$, wherein $0<a\leq4$, $0<b\leq5$, and M is a metal of Groups 2 to 16 of the Periodic Table of Elements, or a combination thereof.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
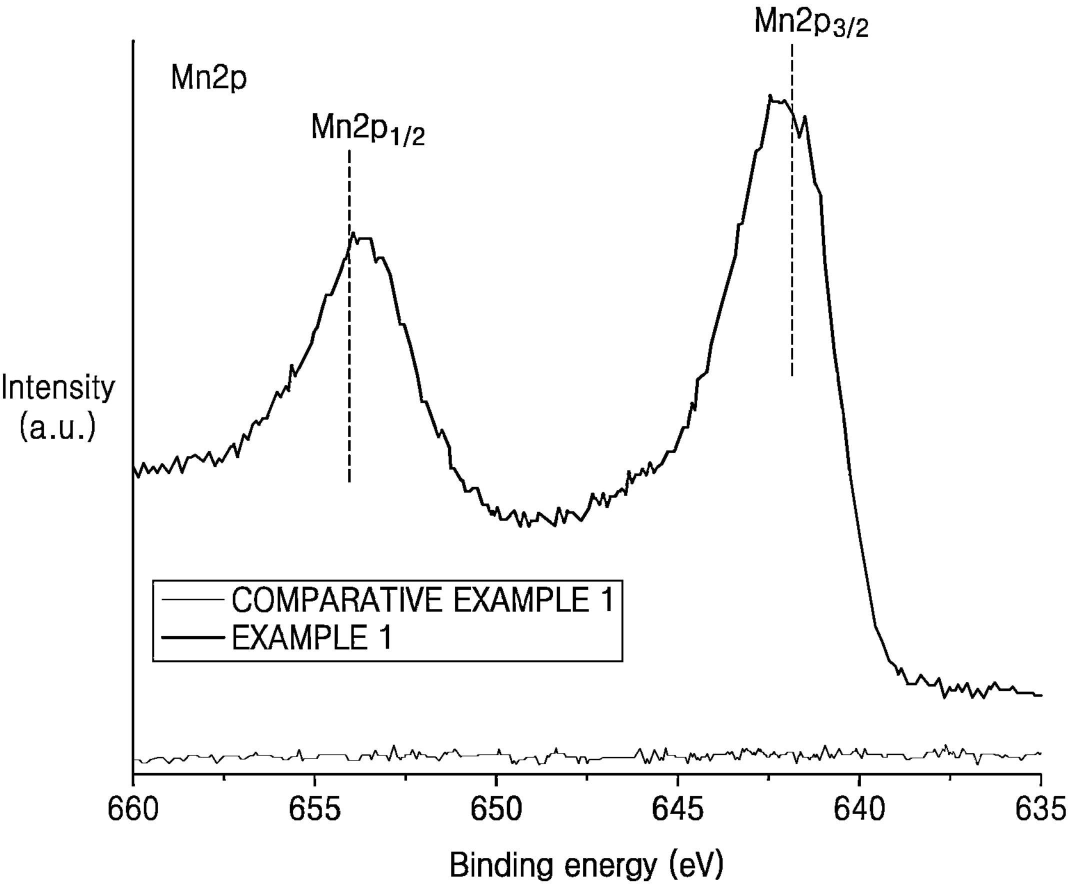
FIGS. 1A to 1E are each a graph of intensity (arbitrary units, a.u.) vs. binding energy (electronvolts, eV) and show the results of X-ray photoelectron spectroscopy (XPS) analysis of organic-inorganic composite catalysts prepared in Example 1 and Comparative Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Rather, these embodiments are provided so that this disclosure will be thorough and complete, and will fully convey the scope of the invention to those skilled in the art. As used herein, the term "and/or" includes any and all combinations of one or more of the associated listed items. Expressions such as "at least one of," when preceding a list of elements, modify the entire list of elements and do not modify the individual elements of the list.

As the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the present inventive concept are encompassed in the present inventive concept.

The terms used in the present specification are merely used to describe particular embodiments, and are not intended to limit the present inventive concept. An expression used in the singular encompasses the expression of the plural, unless it has a clearly different meaning in the context. In the present specification, it is to be understood that the terms such as "including", "having," or the like, are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. As used herein, "I" may be construed, depending on the context, as referring to "and" or "or."

In the drawings, the thicknesses of layers and regions are exaggerated or reduced for clarity. Like reference numerals in the drawings and specification denote like elements. In the present specification, it will be understood that when an element, e.g., a layer, a film, a region, or a substrate, is referred to as being "on" or "above" another element, it can be directly on the other element or intervening layers may also be present. In contrast, when an element is referred to as being "directly on" another element, there are no intervening elements present. While such terms as "first", "second", or the like, may be used to describe various elements, components, regions, layers and/or sections, such elements, components regions, layers and/or sections, must not be limited to the above terms. The above terms are used only to distinguish one element, component, region, layer or section, from another element, component, region, layer or section. Thus, "a first element," "component," "region," "layer" or "section" discussed below could be termed a second element, component, region, layer or section without departing from the teachings herein. Throughout the specification and the drawings, like reference numerals refer to like elements.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Endpoints of ranges may each be independently selected.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, with reference to embodiments, an organic-inorganic composite catalyst, an air purification device including the organic-inorganic composite catalyst, and a method of regenerating the organic-inorganic composite catalyst will be described in detail.

In order to remove pollutants included in air, a porous material with a large specific surface area or a photocatalyst is used to decompose pollutants. For example, activated carbon with a large specific surface area is used as a porous material.

However, the types of pollutants that may be removed using the porous material such as the activated carbon are limited. For example, the porous material has high selectivity for pollutants with similar properties to the porous material but low selectivity for pollutants with opposite properties to the porous material. As the activated carbon has a non-polar surface, the activated carbon exhibits high adsorptivity to non-polar compounds but has relatively low adsorptivity to polar compounds. There is a need for a method that provides excellent removal capability for both non-polar and polar compounds while using a porous material.

In addition, in order to remove pollutants from the porous material containing adsorbed pollutants, a high temperature heat-treatment of more than about 300° C. is generally desired, and such heat-treatment requires an excessive amount of energy. Therefore, there is a need for a method that may easily regenerate and reuse the porous material at a relatively low temperature as compared with the related art.

An organic-inorganic composite catalyst according to an embodiment comprises: a porous carbonaceous particle; and a first compound and a metal oxide particle that are supported on the porous carbonaceous particle, wherein the first compound comprises a polar functional group or an anion, the metal oxide is represented by the formula $M_aO_b$, wherein $0<a\leq4$, $0<b\leq5$, and M is a metal of Groups 2 to 16 of the Periodic Table of Elements, or a combination thereof, and the organic-inorganic composite catalyst is configured to remove a second compound from unpurified air flow including the second compound.

As the organic-inorganic composite catalyst simultaneously may include the porous carbonaceous particle, the first compound, and the metal oxide particle, removal capability for various pollutants included in the unpurified air may be improved. The porous carbonaceous particle may remove the pollutants by adsorption. For example, when a surface of the porous carbonaceous particle is non-polar, as the porous carbonaceous particle has a high affinity for a non-polar compound, the porous carbonaceous particle may easily adsorb and remove the non-polar compound included in the unpurified air. As the first compound containing a polar functional group and/or an anion is supported on the porous carbonaceous particle, a polar compound contained in the unpurified air may be easily adsorbed and removed. As the first compound containing the polar functional group and/or the anion has a high affinity for a polar compound, the first compound may easily adsorb and remove the polar compound. As the metal oxide particle is supported on the porous carbonaceous particle, the pollutants included in the unpurified air may be decomposed and removed. As the first compound and the metal oxide particle are simultaneously supported on the porous carbonaceous particle, the metal oxide particle may act as a catalyst to reduce an activation energy desired for the first compound (e.g., polar compound scavenger) to adsorb the pollutants. As a result, in the organic-inorganic composite catalyst, when the first compound and the metal oxide particle are simultaneously supported on the porous carbonaceous particle, more improved adsorption/removal capability for the pollutants compared with a case where the first compound or the metal oxide particle is supported on the porous carbonaceous particle alone. In addition, as the organic-inorganic composite catalyst includes the first compound and the metal oxide particle supported on the porous carbonaceous particle at the same time, the temperature desired for thermal decomposition of the pollutants adsorbed to the organic-inorganic composite catalyst is lowered, and thus, the organic-inorganic composite catalyst may be easily regenerated.

The second compound may be adsorbed to the organic-inorganic composite catalyst at a first temperature and desorbed from the organic-inorganic composite catalyst and/or pyrolyzed at a second temperature. After the second compound is adsorbed to the organic-inorganic composite catalyst at the first temperature, by changing the temperature of the organic-inorganic composite catalyst to the second temperature, the second compound may be desorbed from the organic-inorganic composite catalyst and/or pyrolyzed by the catalyst to regenerate the organic-inorganic composite catalyst. The second compound may be, for example, adsorbed to the first compound at the first temperature and then desorbed from the first compound at the second temperature. The second compound may be, for example, adsorbed to the first compound by forming a chemical bond with the first compound at the first temperature and may be desorbed from the first compound by deforming the chemical bond with the first compound at the second temperature. The second temperature, for example, may be greater than the first temperature. The second temperature, for example, may be greater than the first temperature, about 50° C. or greater, about 70° C. or greater, about 90° C. or greater, or about 110° C. or greater. In an instance, the second temperature may be greater than the first temperature, from about 50° C. to about 300° C., about 70° C. to about 280° C., about 90° C. to about 260° C., or about 110° C. to about 240° C. For example, after the second compound is adsorbed to the first compound at room temperature, the second compound may be desorbed from the first compound at a high temperature of about 100° C. or greater. As a result, after the second compound is adsorbed to the organic-inorganic composite catalyst at room temperature, the second compound may be desorbed from the organic-inorganic composite catalyst at a high temperature of about 100° C. or greater. In an instance the second compound may be desorbed from the organic-inorganic composite catalyst at from about 100° C. to about 300° C., about 120° C. to about 280° C., about 140° C. to about 260° C., or about 160° C. to about 240° C. A boiling point or a decomposition temperature of the first compound may be greater than, for example, the second temperature. As the boiling point or the decomposition temperature of the first compound is greater than the second temperature, adsorbability of the organic-inorganic composite catalyst may be maintained despite heat-treatment. The boiling point or the decomposition temperature of the first compound may be, for example, greater than the second temperature, about 50° C. or greater, about 100° C. or greater, about 150° C. or greater, or about 200° C. or greater. In an instance, the boiling point or the decomposition temperature of the first compound may be greater than the second temperature, from about 50° C. to about 500° C., from about 100° C. to about 450° C., from about 150° C. to about 400° C., or from about 200° C. to about 350° C. The first temperature may be, for example, about 50° C. or less, about 40° C. or less, or about 30° C. or less. The first temperature may be, for example, about 0° C. to about 50° C., about 5° C. to about 40° C., or about 10° C. to about 30° C. The second temperature may be, for example, about 100° C. to about 300° C., about 100° C. to about 250° C., about 100° C. to about 200° C., or about 140° C. to about 180° C. The boiling point or the decomposition temperature of the first compound may be greater than about 110° C. or greater, about 130° C. or greater, about 150° C. or greater, or about 200° C. or greater. The boiling point or the decomposition temperature of the first compound may be in a range of about 110° C. to about 500° C., about 130° C. to about 500° C., about 150° C. to about 500° C., or about 200° C. to about 500° C.

The first compound may be, for example, a polar compound scavenger. Therefore, the first compound may remove a polar compound from the unpurified air. The polar compound may be, for example, a compound having a dipole moment of about 0.1 debye (D) or greater, about 0.5 D or greater, about 1.0 D or greater, or about 1.5 D or greater. In an instance, the polar compound may be a compound having a dipole moment of about 0.1 D to about 5 D, about 0.5 D to about 4.5 D, about 1.0 D to about 4 D, or about 1.5 D to about 3.5 D. For example, a dipole moment of formaldehyde may be about 2.3 D.

The first compound may be, for example, an organic compound, an inorganic compound, or a combination thereof. The organic compound may be, for example, a monomolecular compound, a polymer compound, or a combination thereof. The molecular weight of the monomolecular compound may be about 200 Daltons or less, about 150 Daltons or less, or about 100 Daltons or less. In an instance, the molecular weight of the monomolecular compound may be about 1 Dalton to about 200 Daltons, about 1 Dalton to about 150 Daltons, about 1 Dalton to about 100 Daltons. The molecular weight of the polymer compound may be, for example, in a range of about 1,000 Daltons to about 2,000,000 Daltons, about 5,000 Daltons to about 1,000,000 Daltons, about 10,000 Daltons to about 1,000,000 Daltons, about 50,000 Daltons to about 1,000,000 Daltons, or about 100,000 Daltons to about 1,000,000 Daltons.

The inorganic compound may be, for example, an ionic compound. The ionic compound may include, for example, a metal cation and an anion including a plurality of atoms. The metal cation may be, for example, an alkali metal cation or an alkaline earth metal cation. The anion including a plurality of atoms may include, for example, carbon, nitrogen, oxygen, sulfur, or a combination thereof. The ionic compound may be, for example, a salt.

The first compound may include a polar functional group, and the polar functional group may be, for example, an amine group, an amide group, an imide group, an ester group, a halogen group, a carbonyl group, or a combination thereof, but is not limited thereto, and any suitable polar functional group used as a polar functional group in the art may be used. The halogen group may be, for example, F, Cl, Br, or I. The first compound may include an anion, and the anion may be, for example, a metabisulfite ion, a sulfite ion, a sulfate ion, or a combination thereof, but is not limited thereto, and any suitable anion used as an anion in the art may be used.

The first compound may be, for example, a monomolecular compound containing an amine group, a polymer containing an amine group, a monomolecular compound containing an amide group, a polymer containing an amide group, a monomolecular compound containing an imide group, a monomolecular compound containing a halogen group, a polymer containing an imide group, a monomolecular compound containing an ester group, a polymer containing an ester group, a monomolecular compound containing a carbonyl group, a polymer containing a carbonyl group, or a combination of at least two thereof. The first compound may include, for example, ethylene urea, urea, sodium metabisulfite, poly(m-xylene adipamide), poly(ethylene terephthalate), iodide, tetrabromoethane, isopropyl iodide, or a combination thereof.

A content of the first compound included in the organic-inorganic composite catalyst may be, for example, in a range of about 0.1 weight percent (wt %) to about 5 wt %, about 0.5 wt % to about 3 wt %, or about 1 wt % to about 3 wt %, based on a total weight of the organic-inorganic composite catalyst. The organic-inorganic composite catalyst may provide improved pollutant removal capability by having the content of the first compound within any of these ranges. A content of the metal oxide particle included in the organic-inorganic composite catalyst may be, for example, in a range of about 0.1 wt % to about 5 wt %, about 0.5 wt % to about 3 wt %, or about 1 wt % to about 3 wt %, based on the total weight of the organic-inorganic composite catalyst. The organic-inorganic composite catalyst may provide improved pollutant removal capability by having the content of the metal oxide particle within any of these ranges. The weight ratio of the first compound to the metal oxide particle included in the organic-inorganic composite catalyst may be, for example, in a range of about 99:1 to about 1:99, about 90:10 to about 10:90, about 80:20 to about 20:80, about 70:30 to about 30:70, or about 60:40 to about 40:60. The organic-inorganic composite catalyst may provide improved pollutant removal capability by having the weight ratio of the first compound to the metal oxide particle within any of these ranges.

The organic-inorganic composite catalyst may include the metal oxide, the metal oxide may include a metal, and the metal may be, for example, Mn, Co, Ce, Ti, Al, Fe, Ni, Na, In, Bi, W, Sn, or a combination thereof. The metal of the metal oxide may be, for example, Mn. The metal oxide may be, for example, $MnO_x$ (where $0<x\leq2$), $Co_xO_y$ (where $0<x\leq3$ and $0<y\leq4$), $CeO_x$ (where $0<x\leq2$), $TiO_x$ (where $0<x\leq2$), $MnO_x$—$TiO_y$ (where $0<x\leq2$ and $0<y\leq2$), $Al_xO_y$ (where $0<x\leq2$ and $0<y\leq3$), $Fe_xO_y$ (where $0<x\leq2$ and $0<y\leq3$), $NiO_x$ (where $0<x\leq1$), $MnO_x$—$Mn_yO_z$ (where $0<x\leq2$, $0<y\leq3$, and $0<z\leq4$), $NaInO_x$ (where $0<x\leq2$), $Bi_xWO_y$ (where $0<x\leq2$ and $0<y\leq6$), $SnO_x$ (where $0<x\leq2$), or a combination thereof. The metal oxide may include $MnO_2$, $Co_3O_4$, $CeO_2$, $TiO_2$, $MnO_2$—$TiO_2$, $Al_2O_3$, $Fe_2O_3$, NiO, $MnO_2$—$Mn_3O_4$, $NaInO_2$, $Bi_2WO_6$, $SnO_2$, or a combination thereof.

The metal oxide particle may be, for example, a primary particle or a secondary particle. The term "secondary particle" as used herein means a particle that is an agglomerate of a plurality of primary particles. The term "primary particle" as used herein means a single, unitary particle having a same composition throughout. A size of the metal oxide particle may be, for example, about 1 micrometer (μm) or less, 800 nm or less, or 500 nm or less. The size of the metal oxide particle may be, for example, in a range of, for example, about 10 nm to about 1 μm, about 10 nm to about 800 nm, about 10 nm to about 500 nm, about 50 nm to about 500 nm, or about 100 nm to about 500 nm. The size of the metal oxide particle may be, for example, a diameter of the metal oxide particle measured in a scanning electron microscope image. The size of the metal oxide particle may be, for example, an average diameter. The average diameter may be measured by using, for example, a measuring device of a laser diffraction method or dynamic light scattering method. The average diameter is a valued measured by, for example, a laser scattering particle size distribution meter (e.g., Horiba LA-920) and is a median particle diameter (D50) corresponding to 50 percent (%) in an accumulated particle size distribution curve from a small particle.

The organic-inorganic composite catalyst may be free of a precious metal, which may include Pt, Au, Pd, Ag, or a combination thereof. The organic-inorganic composite catalyst may be free of the precious metal and provide excellent hazardous material removal capability.

The second compound may be, for example, a polar compound. The polar compound may include, for example, ammonia, an amine compound, an aldehyde compound, a ketone compound, an alcohol compound, a sulfur compound, a thiol compound, a halogenated hydrocarbon, a nitrogen oxide, ozone, a volatile organic compound (VOC), or a combination thereof. The volatile organic compound as used herein means an organic compound having a boiling point of at least 50° C. at 1 atmosphere. The amine compound may include, for example, methylamine, dimethylamine, trimethylamine, ethylamine, aniline, or a combination thereof. The aldehyde compound may include, for example, formaldehyde, acetaldehyde, propionaldehyde (i.e. propanal), propiolaldehyde, butyl aldehyde, or a combination thereof. The ketone compound may include, for example, dimethylketone, methylethylketone, diethylketone, methylpropylketone, dipropylketone, or a combination thereof. The alcohol compound may include, for example, methanol, ethanol, propanol, isopropanol, butanol, pentanol, hexanol, heptanol, or a combination thereof. The sulfur compound may include, for example, hydrogen sulfide, sulfur dioxide, elemental sulfur, or a combination thereof. The thiol compound may include, for example, methanethiol, ethanethiol, 1-propanethiol, 2-propanethiol, propenethiol, butanethiol, tert-butyl mercaptan, thiophenol, or a combination thereof.

The porous carbonaceous particle may be, for example, a spherical particle or a non-spherical particle. The sphericity of a particle may be evaluated by measuring the circularity of the particle projection. The circularity of the particle projection may be, for example, about 0.85 or greater, 0.90 or greater, or 0.95 or greater. In an instance, the circularity of the particle projection may be about 0.85 to about 1, be about 0.90 to about 1, be about 0.95 to about 1. The circularity of the particle projection may be, for example, $4\pi S/L\mathbf{2}$, where S represents an area of the particle projection, and L represents a length around the particle projection. The circularity of a circle is 1, and the closer the circularity of the particle projection is to 1, the higher the sphericity of the particle. The porous carbonaceous particle may be a non-spherical particle having an aspect ratio, for example, of about 2 or greater. The aspect ratio of a non-spherical particle may be, for example, about 3 or greater, about 5 or greater, about 10 or greater, or about 20 or greater. The aspect ratio of a non-spherical particle may be in a range of, for example, about 2 to about 100, about 3 to about 100, about 5 to about 100, about 10 to about 100, or about 20 to about 100. The non-spherical particle may include, for example, a tube-shaped particle, a plate-shaped particle, a needle-shaped particle, a rod-shaped particle, a fibrous particle, or a combination thereof. A size of the porous carbonaceous particle may be in a range of, for example, about 1 μm to about 50 mm, about 10 μm to about 10 mm, about 50 μm to about 5 mm, about 50 μm to about 1 mm, about 50 μm to about 500 μm, about 50 μm to about 300 μm, or about 50 μm to about 200 μm. The size of the porous carbonaceous particle may be, for example, a diameter of the porous carbonaceous particle measured in a scanning electron microscope image. The size of the porous carbonaceous particle may be, for example, an average diameter. The average diameter may be measured by using, for example, a measuring device of a laser diffraction method or dynamic light scattering method. The average diameter is a valued measured by, for example, a laser scattering particle size distribution meter (e.g., Horiba LA-920) and is a median particle diameter (D50) corresponding to 50 percent (%) in an accumulated particle size distribution curve from a small particle.

The porous carbonaceous particle may be, for example, an activated carbon. The activated carbon may be palm-based, coal-based, pitch-based, or a combination thereof. An iodine value of the activated carbon may be about 500 milligrams per gram (mg/g) or greater. In an instance, the iodine value of the activated carbon may be about 500 mg/g to about 1500 mg/g, about 600 mg/g to about 1400 mg/g, about 700 mg/g to about 1300 mg/g, or about 800 mg/g to about 1200 mg/g. The iodine value is a measure of an amount of iodine adsorbed on the surface of a given mass of activated carbon. For example, the specific surface area of the activated carbon may be about 500 square meters per gram ($m^2/g$) or greater or about 1,000 $m^2/g$ or greater. The specific surface area of the activated carbon may be, for example, about 500 $m^2/g$ to about 5,000 $m^2/g$, about 650 $m^2/g$ to about 4,000 $m^2/g$, about 800 $m^2/g$ to about 3,000 $m^2/g$, or about 1,000 $m^2/g$ to about 2,000 $m^2/g$. A maximum volume pore size of the activated carbon may be in a range of about 1 nanometer (nm) to about 10 nm, about 1.5 nm to about 7.5 nm, or about 2 nm to about 5 nm. The specific surface area and the maximum volume pore size of the activated carbon may be measured through a nitrogen adsorption test.

The organic-inorganic composite catalyst, for example, may be placed on a solid substrate. The solid substrate is not particularly limited and may be, for example, a polymer, a ceramic, or a metal. A shape of the solid substrate is not particularly limited and may be a mesh, a foam, a woven fabric, a non-woven fabric, or a honeycomb structure. The organic-inorganic composite catalyst and the solid substrate may be, for example, disposed orthogonal to a direction of an air flow. For example, the air flow may be arranged to pass sequentially through a first side of the organic-inorganic composite catalyst and the solid substrate and a second side opposite the first side. The organic-inorganic composite catalyst may be disposed upstream of the air flow relative to the solid substrate. That is, the organic-inorganic composite catalyst may be in contact with the air flow prior to the solid substrate. In an embodiment, the organic-inorganic composite catalyst and the solid substrate may be, for example, disposed in a direction of the air flow. For example, the air flow may be arranged to move along the first side of the organic-inorganic composite catalyst and the solid substrate and/or the second side opposite the first side.

An air purification device according to an embodiment may include: a housing; and the organic-inorganic composite catalyst, a regenerated organic-inorganic composite catalyst, or a combination thereof placed in the housing, wherein the regenerated organic-inorganic composite catalyst may be a heat-treatment resulting product of the organic-inorganic composite catalyst including the adsorbed second compound. Purification of the unpurified air may be performed more easily by including the organic-inorganic composite catalyst and/or the regenerated organic-inorganic composite catalyst placed in the housing of the air purification device.

The shape of the housing is not particularly limited, and any suitable housing that may accommodate the organic-inorganic composite catalyst may be used.

The regenerated organic-inorganic composite catalyst may be prepared by heat-treating a non-regenerated organic-inorganic composite catalyst including the adsorbed second compound. The regenerated organic-inorganic composite catalyst may be prepared by desorbing and/or decomposing the second compound adsorbed to the organic-inorganic composite catalyst by heat-treatment.

A removal recovery ratio of the regenerated organic-inorganic composite catalyst may be, for example, about 90% or greater, about 95% or greater, or about 99% or greater. In an instance, the removal recovery ratio of the regenerated organic-inorganic composite catalyst may be about 90% to about 110%, 95% to about 105%, or 99% to about 101%. The regenerated organic-inorganic composite catalyst may provide substantially equivalent purification performance to a bare organic-inorganic composite catalyst.

The removal recovery ratio of the regenerated organic-inorganic composite catalyst may be represented by Equation 1:

Removal recovery ratio $(B/A)$=(removal amount of the second compound of the regenerated organic-inorganic composite catalyst $(B)$/removal amount of the second compound of the non-regenerated organic-inorganic composite catalyst $(A)$)×100 percent. Equation 1

The removal amount of the second compound using the non-regenerated organic-inorganic composite catalyst (A) may be an amount of the second compound that may be removed by an unused organic-inorganic composite catalyst before regenerating.

The removal amount of the second compound of the regenerated organic-inorganic composite catalyst (B) may be an amount of the second compound that may be removed under the same conditions as the unused organic-inorganic composite catalyst before the organic-inorganic composite catalyst is regenerated.

The organic-inorganic composite catalyst may be installed as a filter in various indoor and outdoor air purification devices, for example, air purifiers, air purification facilities, or air conditioning facilities to remove gases such as VOCs or micro fine dust. The organic-inorganic composite catalyst is also applicable to air purification devices and systems to remove nitrogen oxides (NOx), sulfur oxides (Sox), ammonia (NH3), odor materials, pathogens, or bacteria in addition to VOC.

For example, a catalyst filter may be provided by placing the organic-inorganic composite catalyst on a filter.

According to an embodiment, a catalyst filter and an air purification system including the same will be described in more detail with reference to FIGS. 9 to 13.

Figure 9:
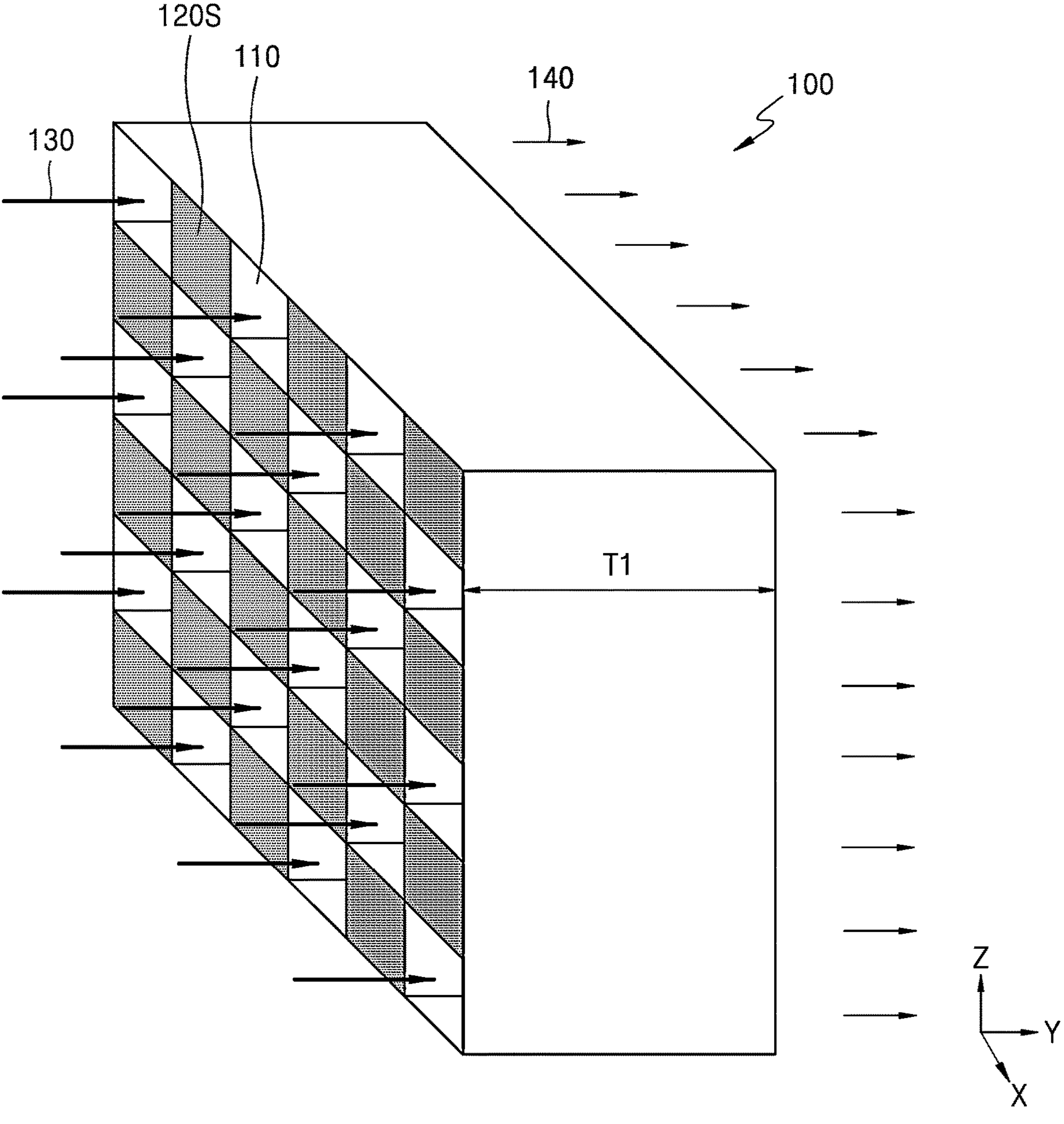
FIG. 9 is a schematic view of an embodiment of a catalyst filter.

As shown in FIG. 9, a catalyst filter 100 may include an inlet surface through which an unpurified air 130 enters and an outlet surface through which purified air 140 is discharged. The unpurified air 130 may include at least one second compound.

The unpurified air 130 may include a particle-phase second compound and a gas-phase second compound. The catalyst filter 100 may have a thickness T1 defined in a Y-axis direction extending from the inlet surface towards the outlet surface.

The catalyst filter 100 includes a plurality of first dented portions 110 each having an inlet adjacent to an inlet surface through which the unpurified air 130 enters and an outlet adjacent an outlet surface through which the purified air 140 is discharged. The unpurified air 130 flows into the catalyst filter 100 through the plurality of the first dented portions 110. The plurality of the first dented portions 110 may be arranged regularly and/or periodically. The plurality of the first dented portions 110 may be arranged parallel to each other.

The catalyst filter 100 may include a plurality of first portions 120S exposed to the inlet surface through which the unpurified air 130 enters. The plurality of the first portions 120S may be arranged regularly. The plurality of the first portions 120S are located between the plurality of the first dented portions 110.

The plurality of the first portions 120S may be spaced apart from each other and located between a plurality of the first dented portions 110 spaced apart from each other in a first direction along a surface of the inlet surface, e.g., in the X-axis direction and/or the Z-axis direction. Thus the plurality of the first portions 120S and the plurality of the first dented portions 110 may be alternately arranged in the first direction along the surface of the inlet surface, e.g., in the X-axis direction and/or the Z-axis direction. One first dented portion 110 may be surrounded by four first portions 120S, and one first portion 120S is surrounded by four first dented portions 110.

Figure 10:
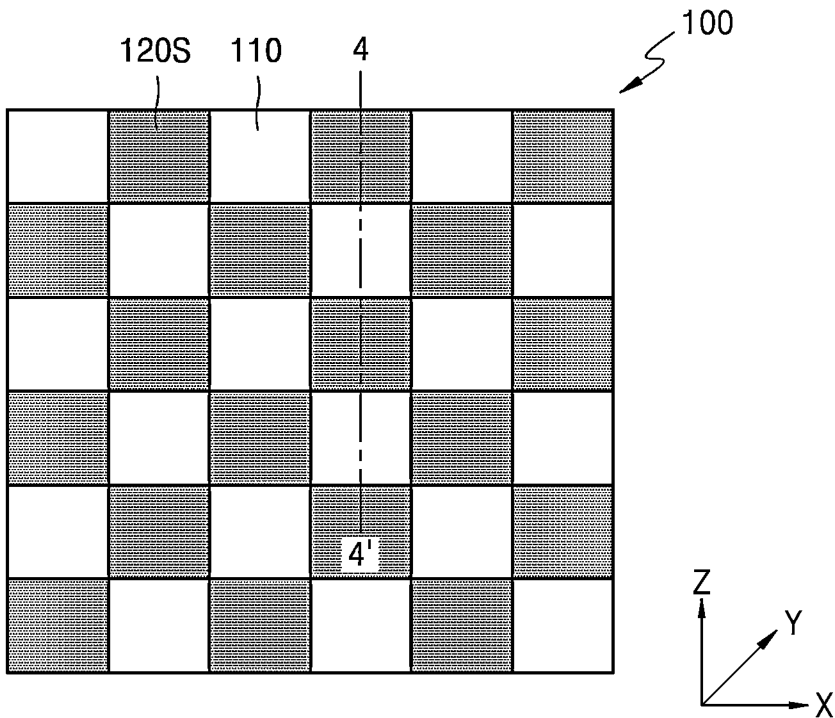
FIG. 10 is a front view of an inlet surface of the catalyst filter of FIG. 9 for unpurified air.
Figure 11:
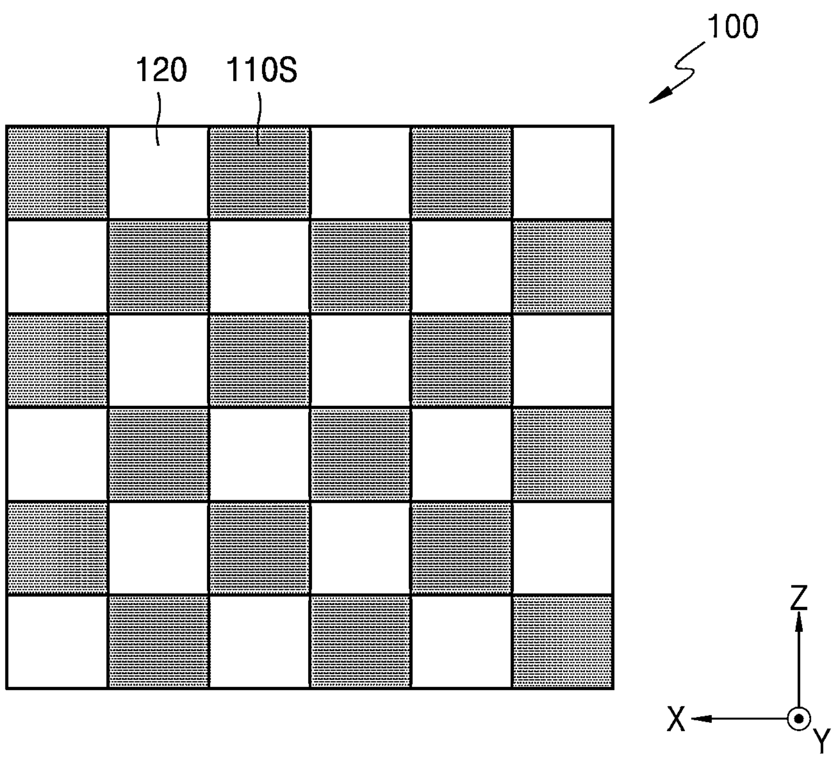
FIG. 11 is a front view of an outlet surface of the catalyst filter of FIG. 9 for purified air.

FIG. 10 is a front view of the catalyst filter 100 of FIG. 9, that is, the inlet surface. FIG. 11 is a back view of the catalyst filter 100 of FIG. 9, that is, the outlet surface.

As shown in FIG. 10, the inlet surface of the catalyst filter 100 includes the plurality of the first dented portions 110 and the plurality of the first portions 120S.

As shown in FIG. 11, the outlet surface of the catalyst filter 100 includes the plurality of the second dented portions 120 and a plurality of second portions 110S. The plurality of the second dented portions 120 may each be an outlet through which purified air is discharged. The purified air discharged through the second dented portion 120 may be air from which the second compound is removed from the unpurified air 130 introduced through the first dented portion 110 or air containing harmless gas obtained by decomposition of the second compound.

The plurality of the second dented portions 120 may be arranged regularly and/or periodically. The plurality of the second portions 110S may be arranged regularly. The plurality of the second portions 120S are located between the plurality of the second dented portions 120.

The plurality of the second portion 110S corresponds to the plurality of the first dented portions 110, and the plurality of the second dented portions 120 corresponds to the plurality of the first portions 120S.

As shown in FIGS. 9 and 11, the second portion 110S may correspond to the back of the first dented portion 110, and the first portion 120S may correspond to the back of the second dented portion 120.

Figure 12:
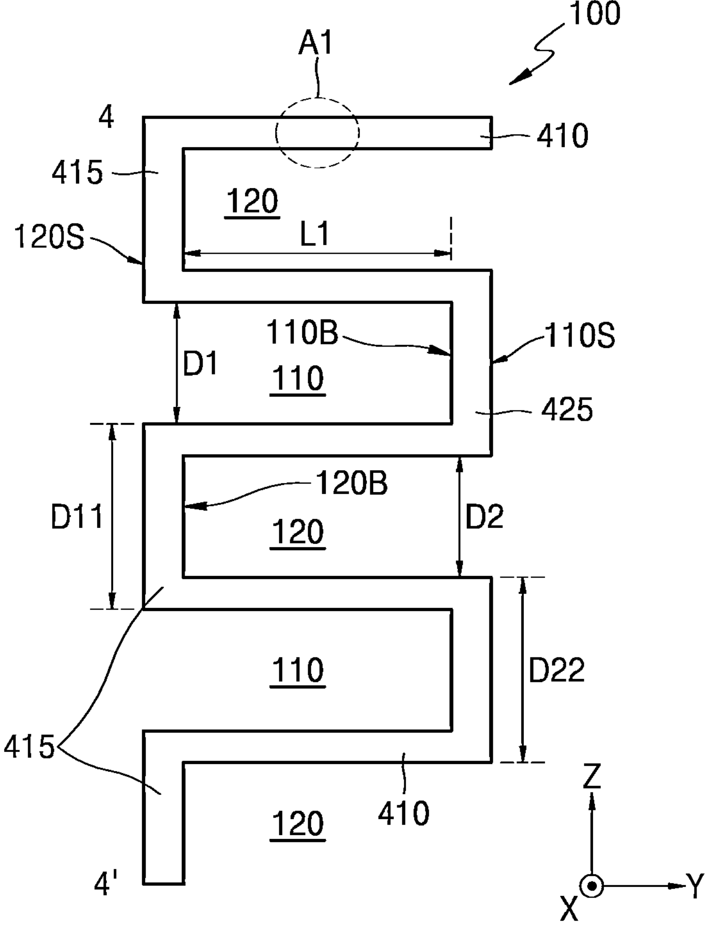
FIG. 12 is a cross-sectional view of the catalyst filter of FIG. 9 taken in a 4-4' direction as indicated in FIG. 10.

FIG. 12 is a cross-sectional view of the catalyst filter of FIG. 9 taken in a 4-4' direction as indicated in FIG. 10.

The catalyst filter 100 may be a single body structure or a single body frame. The catalyst filter 100 may have a frame formed entirely of the same material, for example, a ceramic material, a polymer material, or a metal material. The catalyst filter 100 may have, for example, a single body or monolithic structure. In an embodiment, the catalyst filter 100 may be a multi-layer structure or a multi-layer frame. The catalyst filter 100 may have, for example, although not shown in the drawings, a multi-layer structure including a solid substrate and the organic-inorganic composite catalyst on the solid substrate. As shown in FIG. 12, the catalyst filter 100 is a structure having a frame in which the plurality of the first dented portions 110 and the second dented portions 120 are sequentially arranged in a Z-axis direction. The catalyst filter 100 may include a plurality of horizontal regions 410, and a plurality of vertical regions 415 and 425. The plurality of the horizontal regions 410 may be arranged to be spaced apart from each other along the Z-axis direction. The Z-axis direction corresponds to the vertical direction. A plurality of the horizontal regions 410 may be arranged to be parallel to the Y-axis direction. Lengths of each of the plurality of the horizontal regions 410 may be equal to or different from each other. The plurality of the horizontal regions 410 may be located between the plurality of the vertical regions 415 and 425. A plurality of the horizontal regions 410 may be physically connected to each other through the plurality of the vertical regions 415 and 425. The plurality of the vertical regions 415 and 425 may be arranged parallel to each other and spaced apart from each other. The plurality of the vertical regions 415 and 425 may be arranged to be spaced apart from each other along the Z-axis direction. The plurality of the vertical regions 415 and 425 may be arranged to be parallel to each other along the Y-axis direction. Lengths of each of the plurality of the vertical regions 415 and 425 may be equal to or different from each other. The plurality of the vertical regions 415 and 425 may be located between the plurality of the horizontal regions 410. The plurality of the vertical regions 415 and 425 may be physically connected to each other through the plurality of the vertical regions 410. The plurality of the vertical regions 415 and 425 may include a plurality of the first vertical regions 415 and a plurality of the second vertical regions 425. The plurality of the first vertical regions 415 and the plurality of the second vertical regions 425 may be arranged to be spaced apart from each other along the Y-axis direction. The plurality of the first vertical regions 415 may be arranged to be spaced apart from each other along the Z-axis direction. The plurality of the second vertical regions 425 may also be arranged to be spaced apart from each other along the Z-axis direction. The plurality of the first vertical regions 415 may be arranged on the inlet surface to which the unpurified air 130 is supplied. The plurality of the second vertical regions 425 may be arranged on the outlet surface through which the purified air 140 is discharged.

The plurality of the horizontal regions 410 corresponds to a wall of the first dented portions 110 and the second dented portions 120. A plurality of the horizontal regions 410 may each be located between the first dented portions 110 and the second dented portions 120 to form a boundary between the dented portions 110 and 120. The wall corresponds to the sidewall of the first dented portion 110 and the second dented portion 120. Thicknesses of each of the plurality of the horizontal regions 410 may be equal to or different from each other. The thicknesses of each of the plurality of the horizontal regions 410 may be equal to or different from thicknesses of each of the plurality of the vertical regions 415 and 425. Thus each of the plurality of the horizontal regions 410, and each of the plurality of the vertical regions 415 and 425 may have any suitable thickness. The horizontal regions 410 serving as the wall of the first dented portion 110 may be arranged to be spaced apart by a first distance D1 in the Z-axis direction. The horizontal regions 410 serving as the wall of the second dented portion 120 may be arranged to be spaced apart by a second distance D2 in the Z-axis direction. The first distance D1 and the second distance D2 may be identical to or different from each other. A width (e.g., in an X-axis direction), and/or area of the inlet of the first dented portion 110 and the second dented portion 120 may be identical to or different from each other. Y-axis direction lengths L1 of each of the plurality of the horizontal regions 410 may be equal to or different from each other. The depth of each of the first dented portion 110 and the second dented portion 120 may be defined by the Y-axis direction length L1 of the horizontal region 410. The depth of the first dented portion 110 and the depth of the second dented portion 120 may be identical to or different from each other. The plurality of the first vertical regions 415 may serve as a back of the second dented portion 120. The plurality of the second vertical regions 425 may serve as a back of the first dented portion 110. An air permeability of the back of the first dented portion 110 and an air permeability of the back of the second dented portion 120 may be identical to or different from each other. A height D11 of the first vertical region 415 may be identical to or different from a height D22 of the second vertical region 425. The Y-axis direction thickness of the first vertical region 415 and the Y-axis direction thickness of the second vertical region 425 may be identical to or different from each other.

The plurality of the horizontal regions 410 and the plurality of the vertical regions 415 and 425 may have a single body or monolithic structure connected into one and may be formed of the same material.

Figure 13:
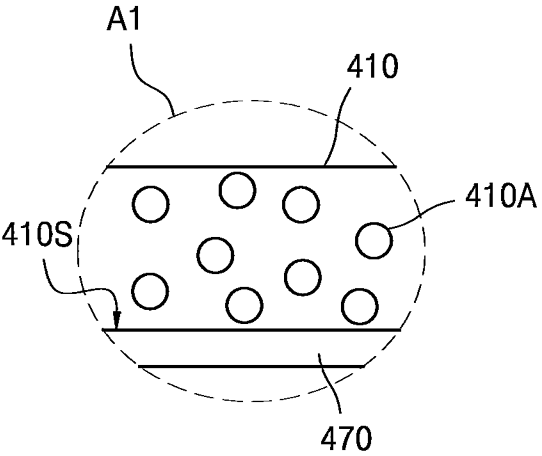
FIG. 13 is an enlarged view of a first area A1 shown in FIG. 12.

FIG. 13 is an enlarged view of a first area A1 of the horizontal region 410 shown in FIG. 12.

As shown in FIG. 13, the horizontal region 410 may include a pore 410A. The vertical regions 415 and 425 may include the pore or may be free of the pore.

The horizontal region 410 and the vertical regions 415 and 425 may include the pore, and a pore density of the vertical regions 415 and 425 may be greater or less than a pore density of the horizontal region 410.

For example, the first vertical region 415 may include the pore, and the second vertical region 425 may be free of the pore. In an embodiment, the first vertical region 415 may be free of the pore, and the second vertical region 425 may include the pore.

The first vertical region 415 and the second vertical region 425 may include the pore, and a pore density of the second vertical region 425 may be greater or less than a pore density of the first vertical region 415.

A catalyst layer 470 containing the organic-inorganic composite catalyst may be placed on an exposed side 410S of the horizontal region 410. The catalyst layer 470 may be, for example, placed on both of the horizontal region 410 and the vertical regions 415 and 425.

According to an embodiment, a method of regenerating an organic-inorganic composite catalyst comprises: providing an organic-inorganic composite catalyst comprising an adsorbed second compound, and heat-treating the organic-inorganic composite catalyst comprising the adsorbed second compound to provide a regenerated organic-inorganic composite catalyst, wherein the organic-inorganic composite catalyst comprises a porous carbonaceous particle; and a first compound and a metal oxide particle that are supported on the porous carbonaceous particle, wherein the first compound comprises a polar functional group or an anion, the metal oxide may be represented by Formula $M_aO_b$ wherein $0<a\leq4$, $0<b\leq5$, and M may be a metal of Groups 2 to 16 of the Periodic Table of Elements, or a combination thereof. A regenerated organic-inorganic composite catalyst may be prepared by heat-treating the organic-inorganic composite catalyst including the adsorbed second compound. As a result, a lifespan of the organic-inorganic composite catalyst may be extended because the organic-inorganic composite catalyst may be simply recycled.

In the providing of the regenerated organic-inorganic composite catalyst, heat-treatment may be performed at a temperature in a range of, for example, about 100° C. to about 300° C. for about 1 minute to about 30 hours. The heat-treatment may be performed at a temperature of, for example, about 100° C. to about 250° C., about 100° C. to about 200° C., about 100° C. to about 180° C., or about 100° C. to about 170° C. Energy required for the heat-treatment may be reduced by using the organic-inorganic composite catalyst, performing heat-treatment at a relatively low temperature of 300° C. or less. For example, activated carbon desires a high-temperature heat-treatment of 700° C. or greater for regeneration, so excessive energy is desired.

The method of preparing an organic-inorganic composite catalyst may further include: prior to the providing of the organic-inorganic composite catalyst including the adsorbed second compound, contacting the organic-inorganic composite catalyst with an unpurified air flow including the second compound. By placing the organic-inorganic composite catalyst on a solid substrate in an air purification device and by supplying the unpurified air containing the second compound, the second compound may be adsorbed onto the organic-inorganic composite catalyst, thus providing the organic-inorganic composite catalyst in which consequently contains the adsorbed second compound.

In addition, the method may further include, prior to the contacting of the organic-inorganic composite catalyst with the unpurified air flow including the second compound, providing an organic-inorganic composite catalyst.

The providing of the organic-inorganic composite catalyst, for example, may include: providing a first composition including a solvent, a metal oxide precursor, and the first compound; mixing the porous carbonaceous particle with the first composition to provide a second composition; adding a reducing agent to the second composition to provide a third composition including the metal oxide particle; and drying the third composition to obtain the organic-inorganic composite catalyst.

First, the first composition may be provided by adding a metal oxide precursor and a first compound to the solvent to obtain a mixture and stirring the mixture.

The solvent is not particularly limited and may be alcohol or water. Any suitable material available as a solvent in the art may be used.

The metal oxide precursor is a compound that may form metal oxide by reduction. The metal oxide precursor may be, for example, a metal halide, a metal sulfate, a metal sulfonate, a metal sulfite, a metal nitrate, a metal carbonate, or a combination thereof.

The metal of the metal oxide precursor may be Mn, Co, Ce, Ti, Al, Fe, Ni, Na, In, Bi, W, Sn, or a combination thereof. The metal oxide precursor may be, for example, $KMnO_4$, $MnCl_2$, $MnSO_4$, $MnSO_3$, $Mn(NO_3)_2$, or $MnCO_3$.

The first compound may include, for example, ethylene urea, urea, sodium metabisulfite, poly(m-xylene adipamide), poly(ethylene terephthalate), iodide, tetrabromoethane, isopropyl iodide, or a combination thereof.

The first composition may include, for example, about 1 part to about 30 parts by weight, about 1 part to about 20 parts by weight, or about 1 part to about 10 parts by weight of the metal oxide precursor, based on 100 parts by weight of a solvent.

The first composition may include, for example, about 1 part to about 30 parts by weight, about 1 part to about 20 parts by weight, or about 1 part to about 10 parts by weight of the first compound, based on 100 parts by weight of a solvent.

The weight ratio of the metal oxide precursor to the first compound included in the first composition may be in a range of about 99:1 to about 1:99, about 90:10 to about 10:90, about 80:20 to about 20:80, about 70:30 to about 30:70, or about 60:40 to about 40:60.

Subsequently, the second composition may be prepared by adding the porous carbonaceous particle to the first composition or by adding the first composition to the porous carbonaceous particle.

For example, the second composition may be prepared by adding the porous carbonaceous particle sequentially or simultaneously to the first composition to obtain a mixture and stirring the mixture. For example, the second composition may be prepared by dropping the first composition sequentially or simultaneously on the porous carbonaceous particle. The weight ratio of the porous carbonaceous particle to the first composition included in the second composition may be in a range of about 90:10 to about 10:90, about 80:20 to about 20:80, about 70:30 to about 30:70, or about 60:40 to about 40:60.

The porous carbonaceous particle may be, for example, an activated carbon. The activated carbon may be understood by referring to the descriptions of the organic-inorganic composite catalyst described above.

Then, the third composition including the metal oxide particle may be prepared by reducing the metal oxide precursor to metal oxide by adding a reducing agent to the second composition.

The type of the reducing agent may be, for example, carbohydrazide, hydrazine, sodium borohydride, or a combination thereof, but is not necessarily limited thereto. Any suitable reducing agent used in the art may be used. The content of the reducing agent may be, for example, about 10 parts to about 200 parts by weight, about 10 parts to about 100 parts by weight, or about 10 parts to about 50 parts by weight, based on 100 parts by weight of the metal oxide precursor.

Then, the third composition may be dried to obtain the organic-inorganic composite catalyst.

The drying of the third composition may be performed, for example, at a temperature range from about 100° C. to about 200° C., about 100° C. to about 150° C., or about 100° C. to about 140° C. The drying temperature may differ depending on the type of solvent.

The drying time of the third composition may be, for example, about 1 minute to about 30 hours, about 1 minute to about 10 hours, or about 1 minute to about 5 hours.

Hereinafter example embodiments will be described in detail with reference to Examples and Comparative Examples. These examples are provided for illustrative purposes only and are not intended to limit the scope of the disclosure.

EXAMPLES

Preparation of Organic-Inorganic Composite Catalyst

Example 1: Activated Carbon/Ethylene Urea/$MnO_2$ 300 g of deionized water, 12.5 g of $KMnO_4$, and 15 g of ethylene urea were added to prepare a first composition. A reducing agent solution was prepared by mixing 300 g of deionized water with 5 g of a reducing agent (carbohydrazide).

By mixing activated carbon with the first composition, a second composition including a first complex impregnated with Mn ion and ethylene urea in activated carbon was prepared.

By mixing the second composition with the reducing agent solution, a third composition including a second complex impregnated with $MnO_2$ and ethylene urea in activated carbon was obtained.

The third composition was dried at 130° C. for 6 hours to prepare an organic-inorganic composite catalyst loaded with ethylene urea and $MnO_2$ on the activated carbon.

The content of ethylene urea was 2.8 wt %, and the content of $MnO_2$ was adjusted to 1.3 wt %, based on the total weight of the organic-inorganic composite catalyst.

Example 2: Mn Precursor (25 g)

An organic-inorganic composite catalyst was prepared in the same manner as in Example 1, except that the content of $KMnO_4$ as a metal oxide precursor was changed to 25 g.

Example 3: Reducing Agent (2.5 g)

An organic-inorganic composite catalyst was prepared in the same manner as in Example 1, except that the content of the reducing agent was changed to 2.5 g.

Example 4: Reducing Agent (10 g)

An organic-inorganic composite catalyst was prepared in the same manner as in Example 1, except that the content of the reducing agent was changed to 10 g.

Example 5: Hydrazine Reducing Agent

An organic-inorganic composite catalyst was prepared in the same manner as in Example 1, except that the reducing agent was changed to hydrazine.

Example 6: Sodium Borohydride Reducing Agent

An organic-inorganic composite catalyst was prepared in the same manner as in Example 1, except that the reducing agent was changed to sodium borohydride.

Comparative Example 1: Activated Carbon

Activated carbon itself was used as a catalyst.

Comparative Example 2: Activated Carbon/Ethylene Urea 300 g of deionized water and 15 g of ethylene urea were added to prepare a first composition.

By mixing activated carbon with the first composition, a second composition including a complex impregnated with ethylene urea in the activated carbon was prepared.

The second composition was dried at 130° C. for 6 hours to prepare a composite catalyst loaded with ethylene urea on activated carbon.

The content of ethylene urea was 2.5 wt %, based on the total weight of the composite catalyst.

Comparative Example 3: Activated Carbon/$MnO_2$ 300 g of deionized water and 12.5 g of $KMnO_4$ were added to prepare a first composition. A reducing agent solution was prepared by mixing 300 g of deionized water with 5 g of a reducing agent (carbohydrazide).

By mixing activated carbon with the first composition, a second composition including a first complex impregnated with Mn ion in the activated carbon was prepared.

By mixing the second composition with the reducing agent solution, a third composition including a second complex impregnated with $MnO_2$ in the activated carbon was obtained.

The third composition was dried at 130° C. for 6 hours to prepare a composite catalyst loaded with $MnO_2$ on activated carbon.

The content of $MnO_2$ was 1.3 wt %, based on the total weight of the composite catalyst.

Comparative Example 4: Activated Carbon/Mn/Pt $Mn(NO_3)_2 6H_2O$ and $PtCl_4$ were added to deionized water to prepare a first composition.

Activated carbon was mixed with the first composition to prepare a second composition.

The second composition was dried at 130° C. for 6 hours to prepare a composite catalyst loaded with Mn and Pt on the activated carbon.

The content of Mn was 0.75 wt %, and the content of Pt was adjusted to 0.5 wt %, based on the total weight of the composite catalyst.

Manufacture of Filter and Air Purification Device

Examples 7 to 12

A filter was prepared by coating each of the organic-inorganic composite catalyst prepared in Examples 1 to 6 on one side of a plate-shaped porous solid substrate.

An air purification device was prepared by including an inlet, an outlet, and a reaction chamber between the inlet and the outlet, wherein air was supplied through the inlet and discharged through the outlet, and the filter was arranged across the air flow moving from the inlet to the outlet in the reaction chamber. A filter was installed in the reaction chamber such that the organic-inorganic composite catalyst was placed upstream of the air flow compared with the porous solid substrate.

Comparative Examples 5 to 8

Filters and air purification devices were manufactured in the same manner as in Example 7, except that the organic-inorganic composite catalysts prepared in Comparative Examples 1 to 4 were used, respectively.

Evaluation Example 1: XPS Analysis

FIGS. 1A to 1E are each a graph showing X-ray photo-electron spectroscopy (XPS) measurement results of the organic-inorganic composite catalyst prepared in Example 1 and the catalyst prepared in Comparative Example 1.

Peaks of the Mn 2p orbital derived from the organic-inorganic composite catalyst prepared in Example 1 are shown in FIG. 1A.

Figure 1B:
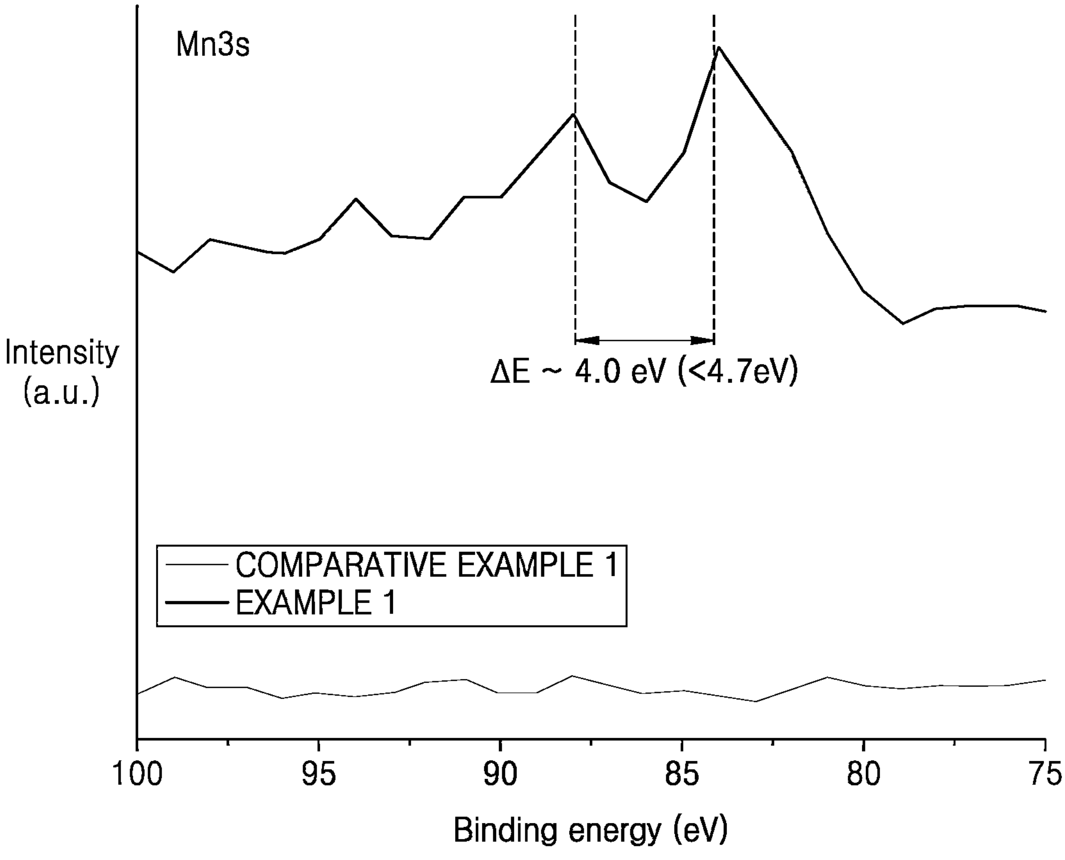

Peaks of the Mn 3s orbital derived from the organic-inorganic composite catalyst prepared in Example 1 are shown in FIG. 1B.

Figure 1C:
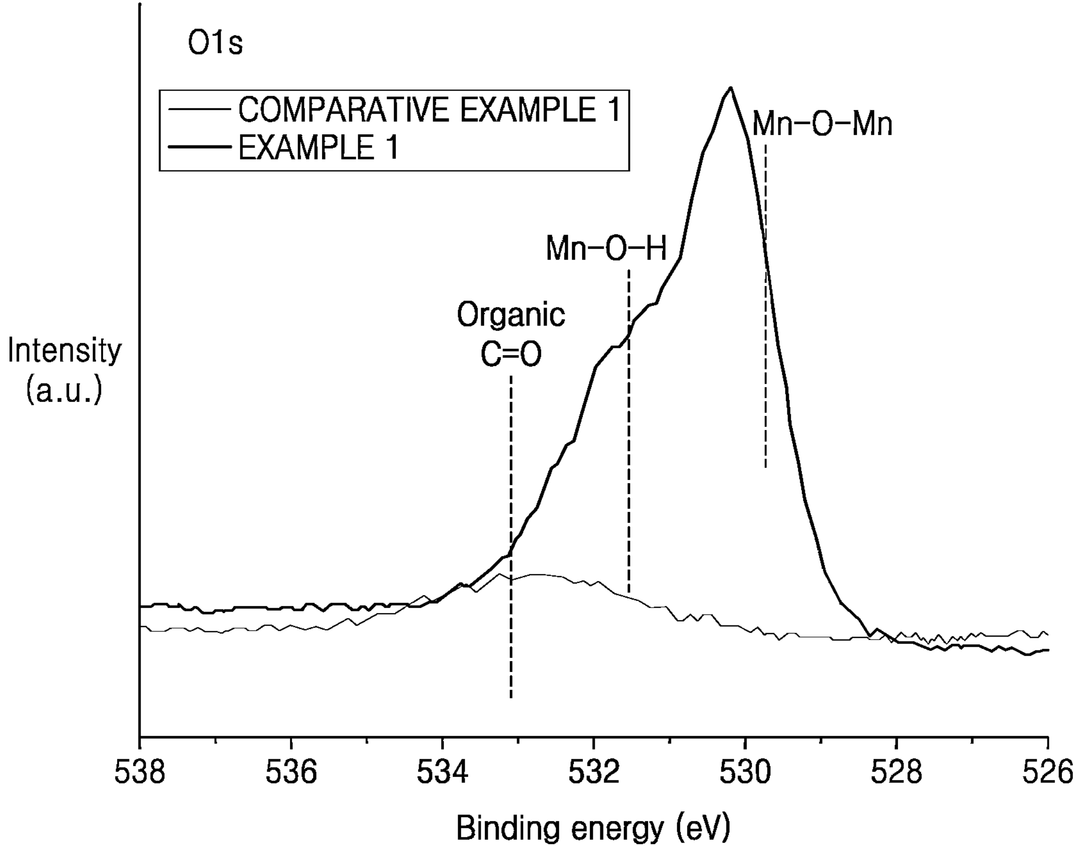

A peak corresponding to a carbonyl group derived from the activated carbon in Comparative Example 1, a peak corresponding to a Mn—O—H bond derived from the organic-inorganic composite catalyst prepared in Example 1, and a peak corresponding to a Mn—O—Mn bond derived from the organic-inorganic composite catalyst prepared in Example 1 are shown in FIG. 1C.

Figure 1D:
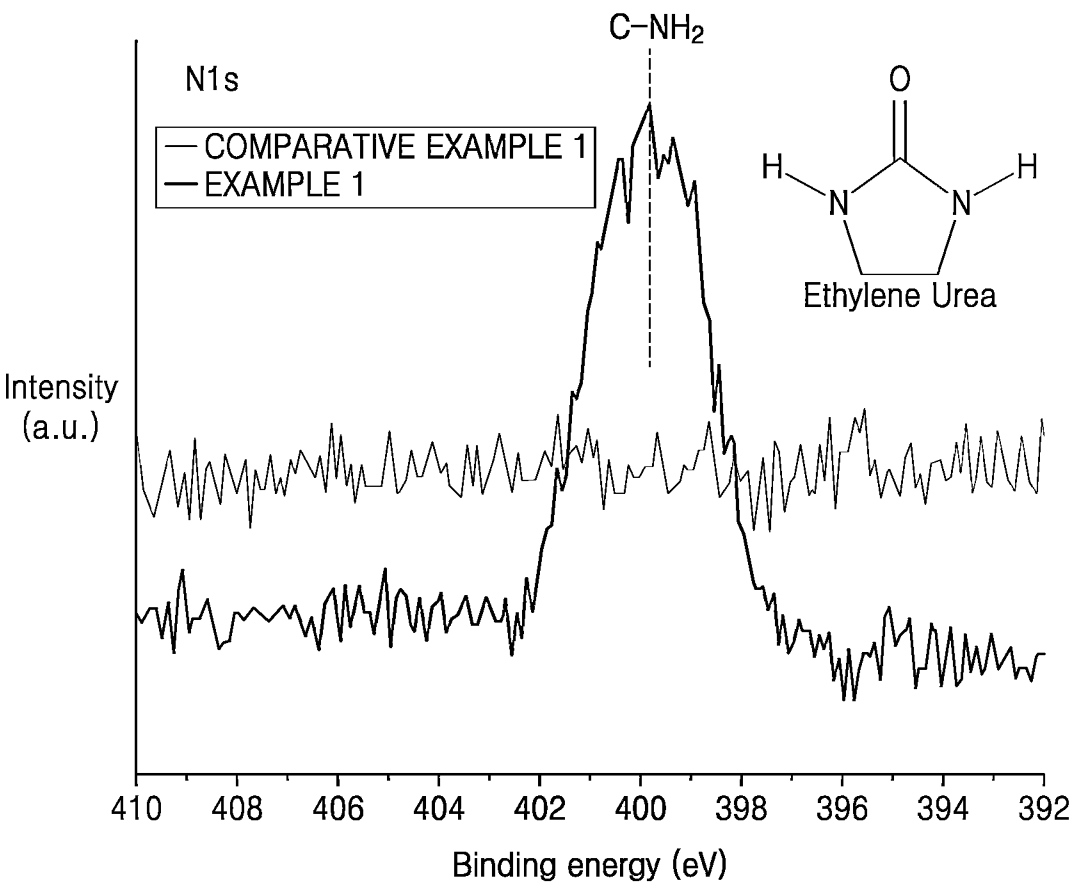

A peak corresponding to a C—$NH_2$ bond derived from ethylene urea of the organic-inorganic composite catalyst prepared in Example 1 is shown in FIG. 1D.

Figure 1E:
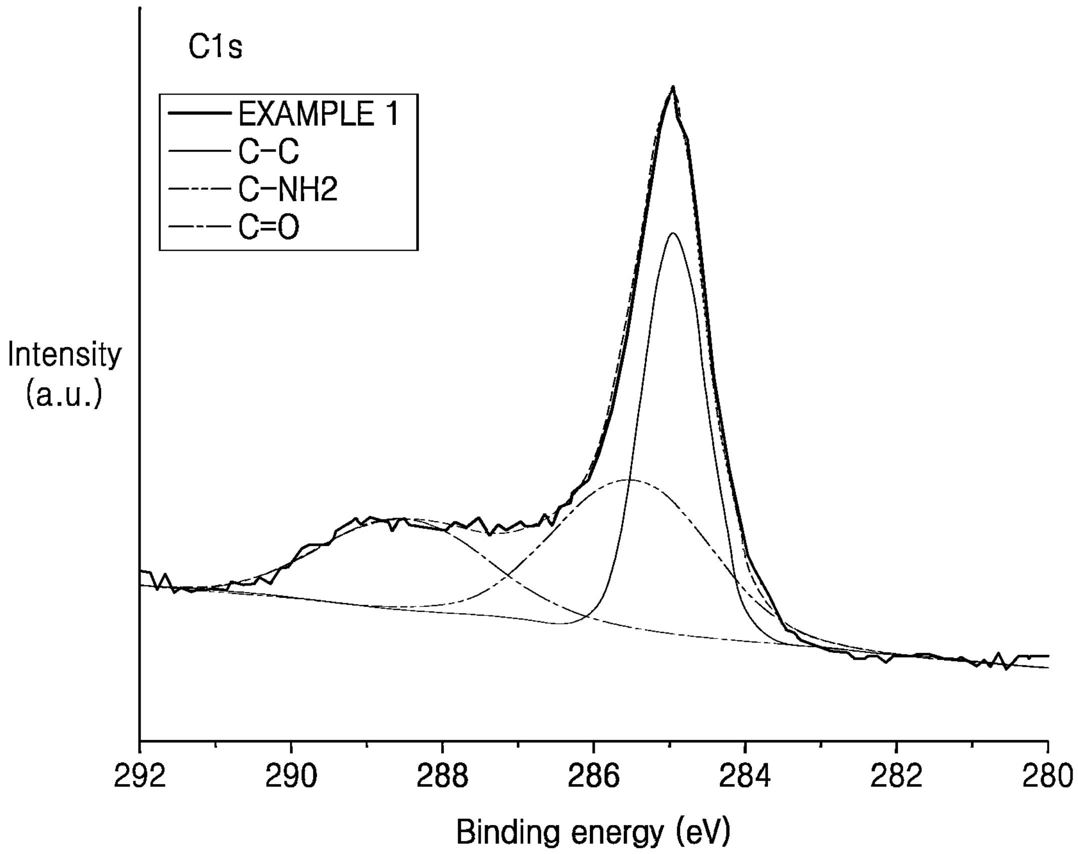
Figure 2A:
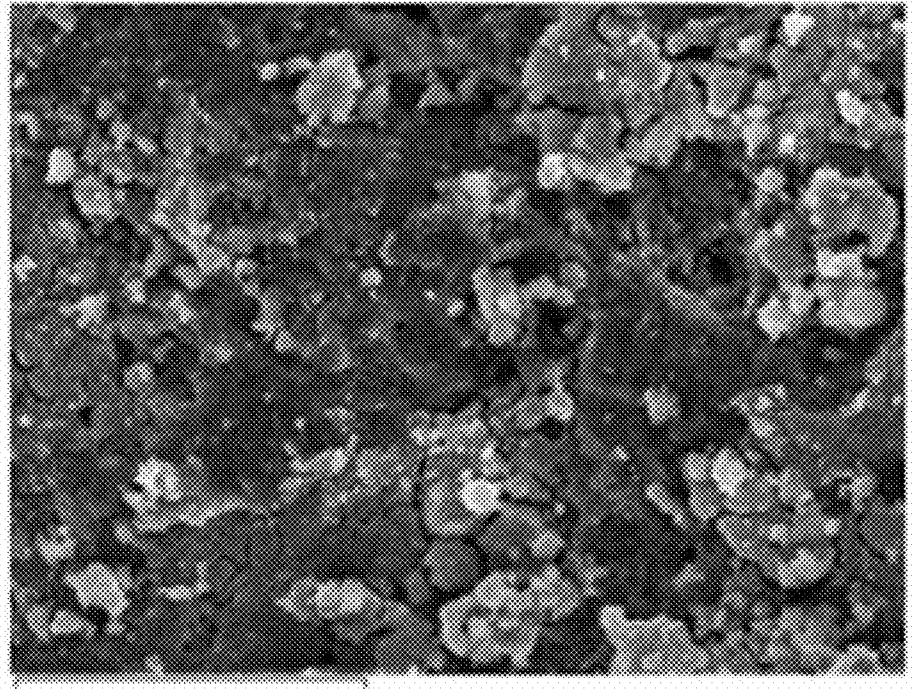
FIG. 2A is a scanning electron microscopy (SEM) image of the organic-inorganic composite catalyst prepared in Example 1.
Figure 2B:
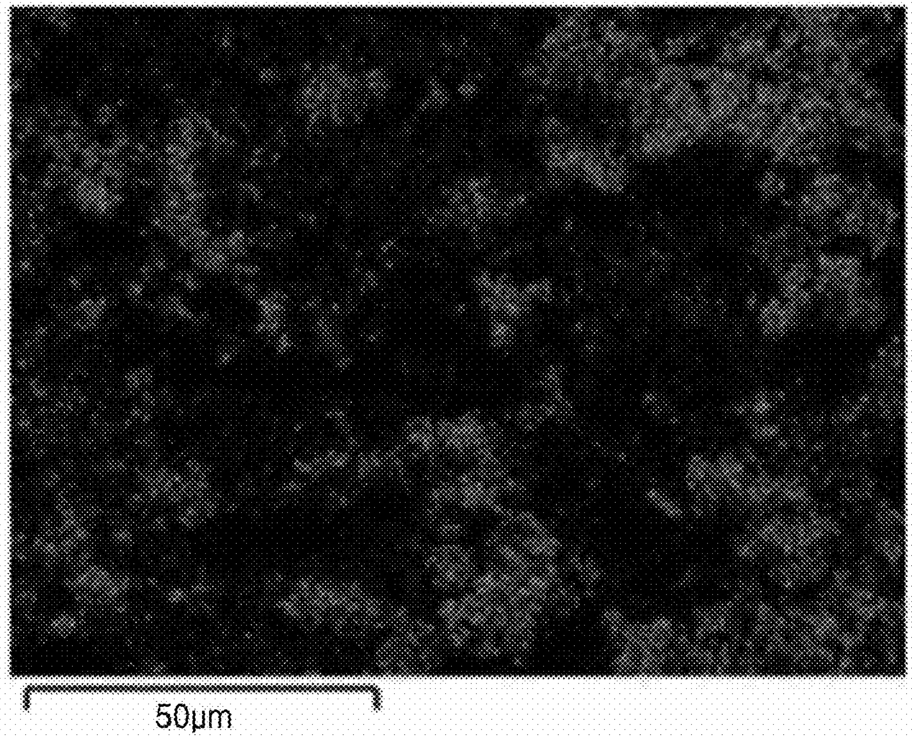
FIGS. 2B and 2C are each an energy dispersive spectroscopy (EDS) map of oxygen (O) and manganese (Mn), respectively, of the organic-inorganic composite catalyst prepared in Example 1.
Figure 2C:
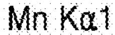
Figure 2C:
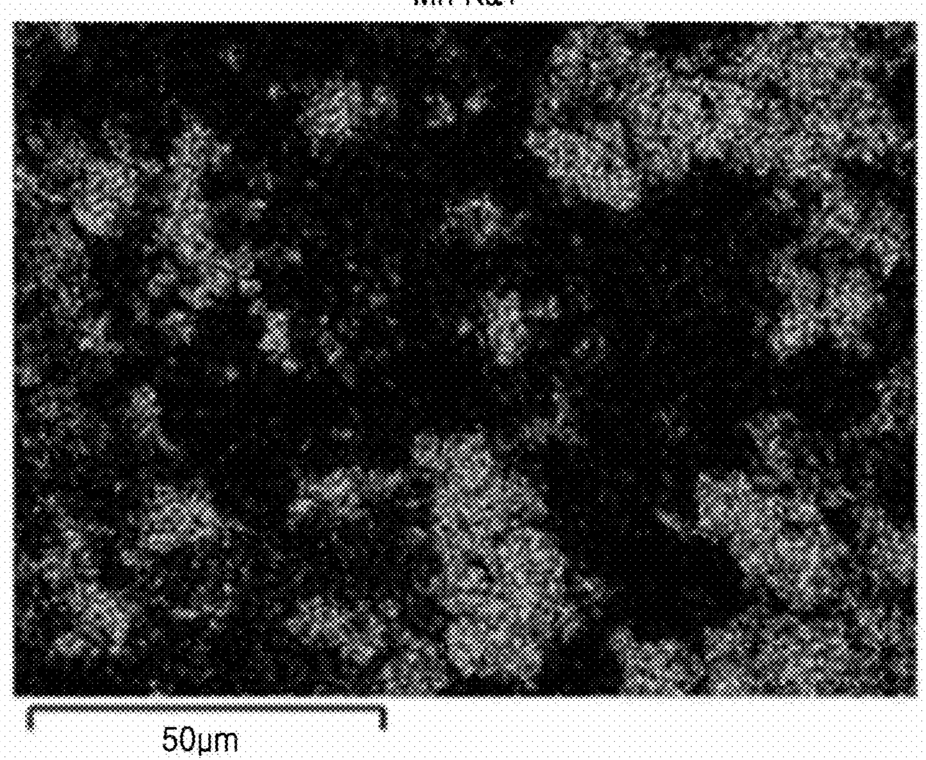
Figure 2D:
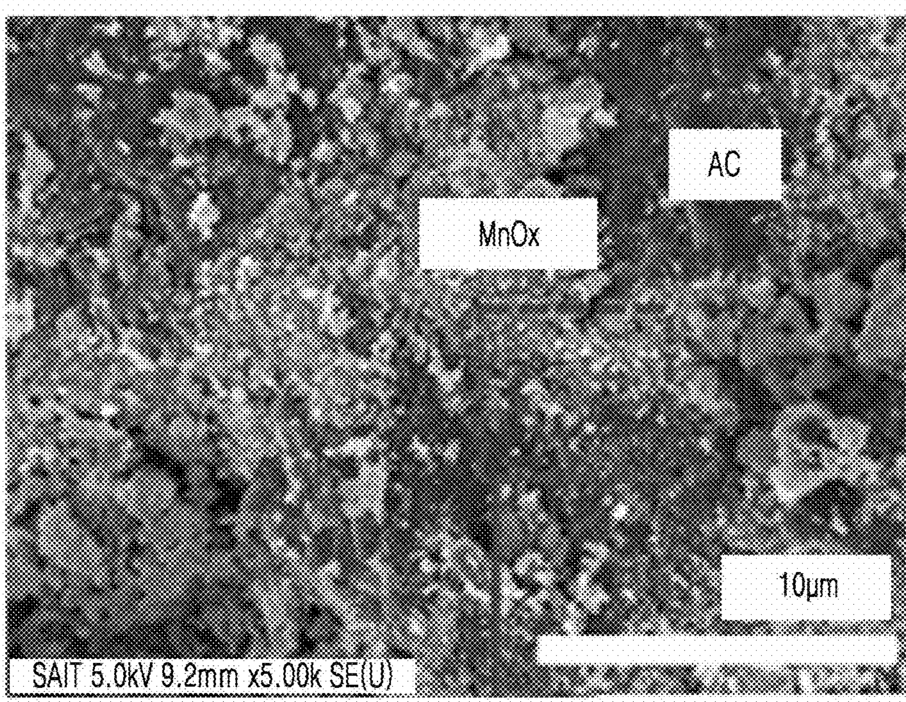
FIGS. 2D and 2E are each a scanning electron microscopy (SEM) image of the organic-inorganic composite catalyst prepared in Example 1.
Figure 2E:
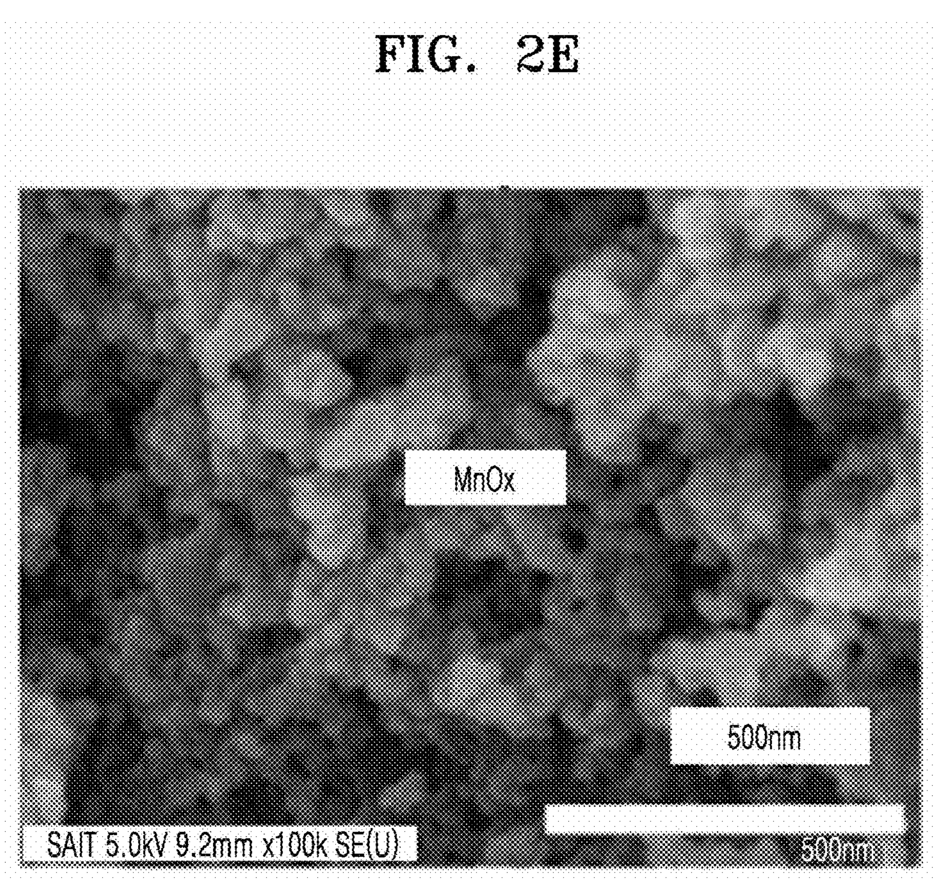

Peaks of a C—C bond, a C—$NH_2$ bond, and a C═O bond derived from the organic-inorganic composite catalyst prepared in Example 1 are shown in FIG. 1E.

Thus, it was confirmed that ethylene urea and manganese oxide were supported on the organic-inorganic composite catalyst. The manganese oxide may be, for example, $MnO_2$.

Evaluation Example 2: SEM-EDS Analysis

The scanning electron microscopy-energy dispersive x-ray spectroscopy (SEM-EDS) elemental mapping analysis were performed on a surface of the organic-inorganic composite catalyst prepared in Example 1. The results thereof are shown in FIGS. 2A to 2E.

As shown in FIGS. 2A to 2E, it was confirmed that manganese oxide was supported on the activated carbon surface. The manganese oxide may be, for example, $MnO_2$.

Evaluation Example 3: FT-IR Analysis

Fourier-transform infrared (FT-IR) spectroscopy of the catalyst prepared in Comparative Example 1 and the organic-inorganic composite catalyst prepared in Example 1 were performed. The results thereof are shown in FIG. 3.

Figure 3:
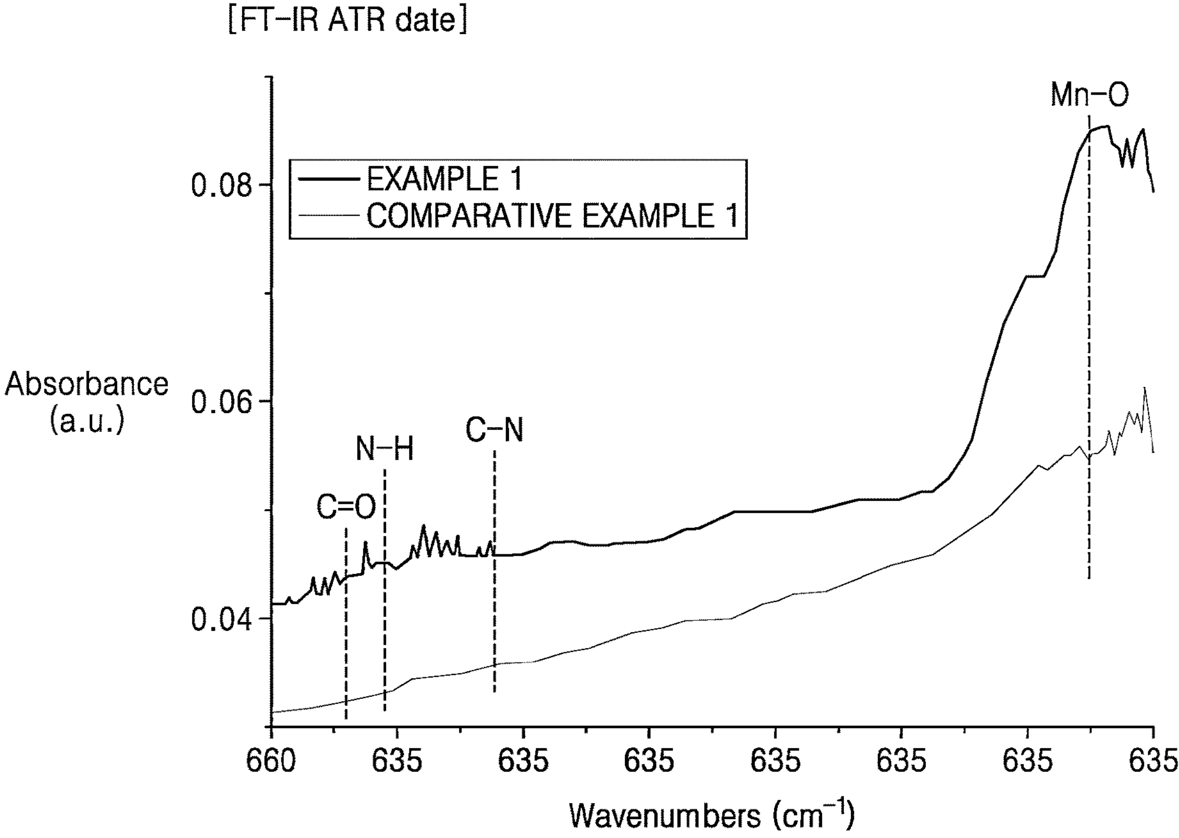
FIG. 3 is a graph of absorbance (a.u.) vs. wave numbers (inverse centimeters, $cm^{-1}$) and shows the results of a Fourier-transform infrared (FT-IR) spectroscopy of the organic-inorganic composite catalyst prepared in Example 1.

A peak corresponding to an N—H bond derived from ethylene urea, a peak corresponding to a C—N bond derived from ethylene urea, a peak corresponding to a C═O bond derived from ethylene urea, and a peak corresponding to a Mn—O bond derived from ethylene urea are shown in FIG. 3.

It was confirmed that ethylene urea and manganese oxide were supported on the activated carbon particles. The manganese oxide may be, for example, $MnO_2$.

Evaluation Example 4: Brunauer-Emmett-Teller (BET) Analysis

Figure 4A:
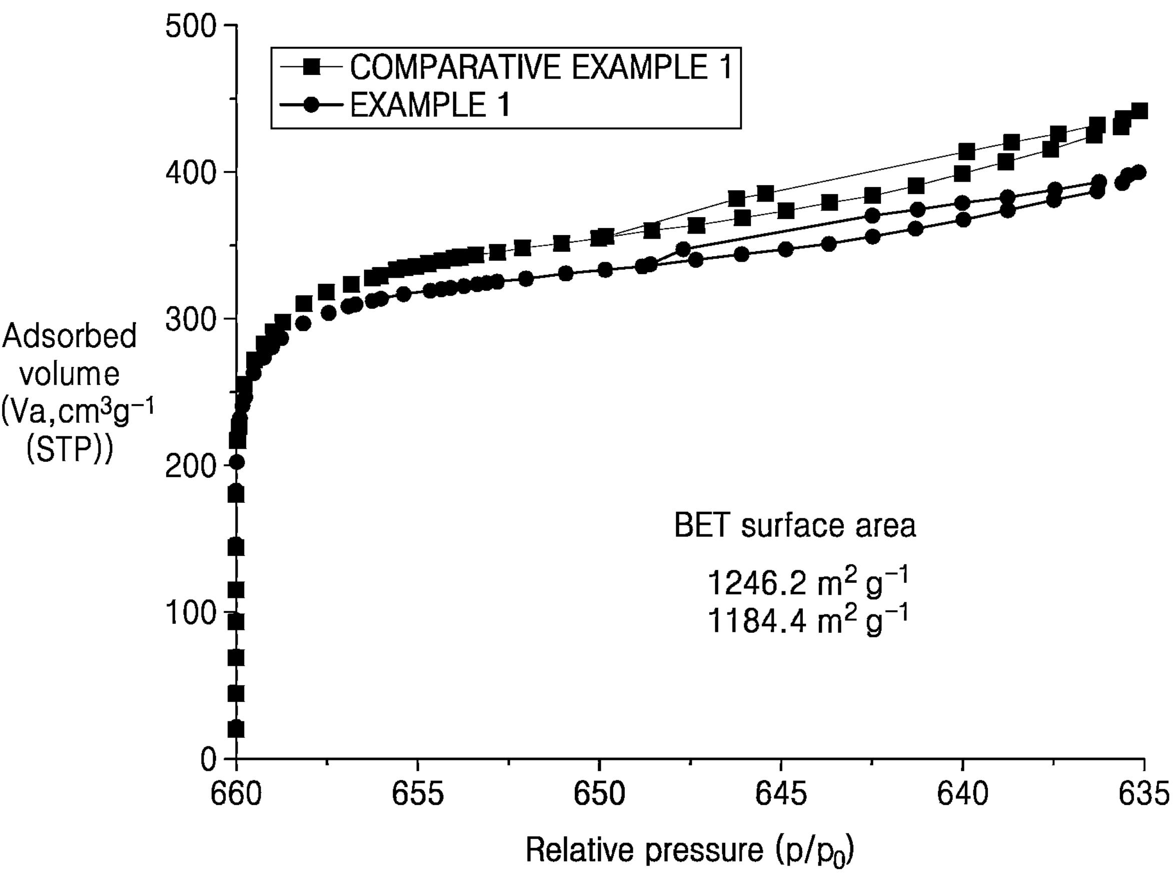
FIG. 4A is a graph of adsorbed volume ($V_a$, $cm^3g^{-1}$ (standard temperature and pressure, STP)) vs. relative pressure ($p/p_0$) showing nitrogen adsorption test results of the organic-inorganic composite catalyst prepared in Example 1.
Figure 4B:
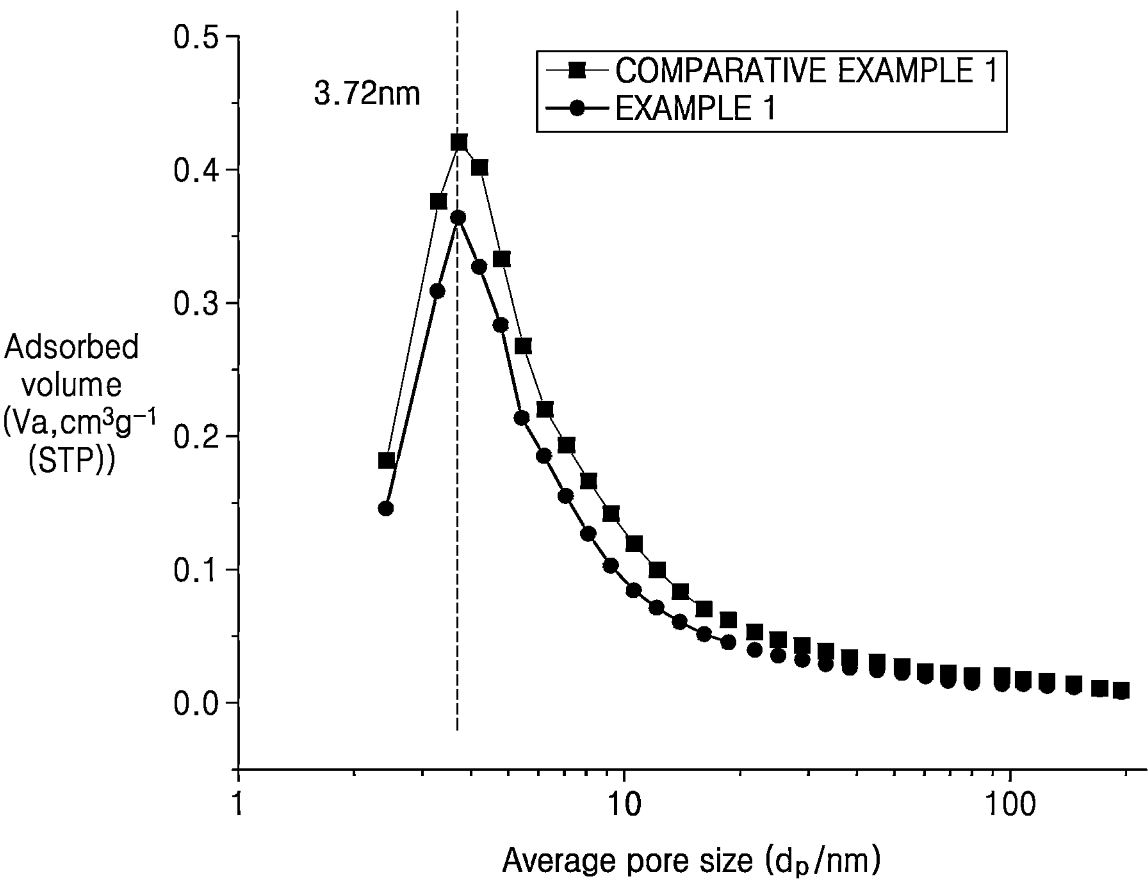
FIG. 4B is a graph of adsorbed volume ($V_a$, $cm^3g^{-1}$ (STP) vs. average pore size ($d_p$, nanometers, nm) showing nitrogen adsorption test results of the organic-inorganic composite catalyst prepared in Example 1.

The specific surface area and the average pore size were specified through nitrogen adsorption test on the catalyst prepared in Comparative Example 1 and the organic-inorganic composite catalyst prepared in Example 1 are shown in FIG. 4A and FIG. 4B, respectively.

The specific surface area of the organic-inorganic composite catalyst of Example 1 was 1184.4 $m^2/g$, and the specific surface area of the catalyst of Comparative Example 1 was 1246.2 $m^2/g$.

As shown in FIG. 4A, the specific surface area of the catalyst of Example 1 was reduced by 5%, as compared with the specific surface area of the catalyst of Comparative Example 1. As shown in FIG. 4B, the average pore size of the catalyst of Comparative Example 1 and the average pore size of the catalyst of Example 1 barely changed.

Figure 5:
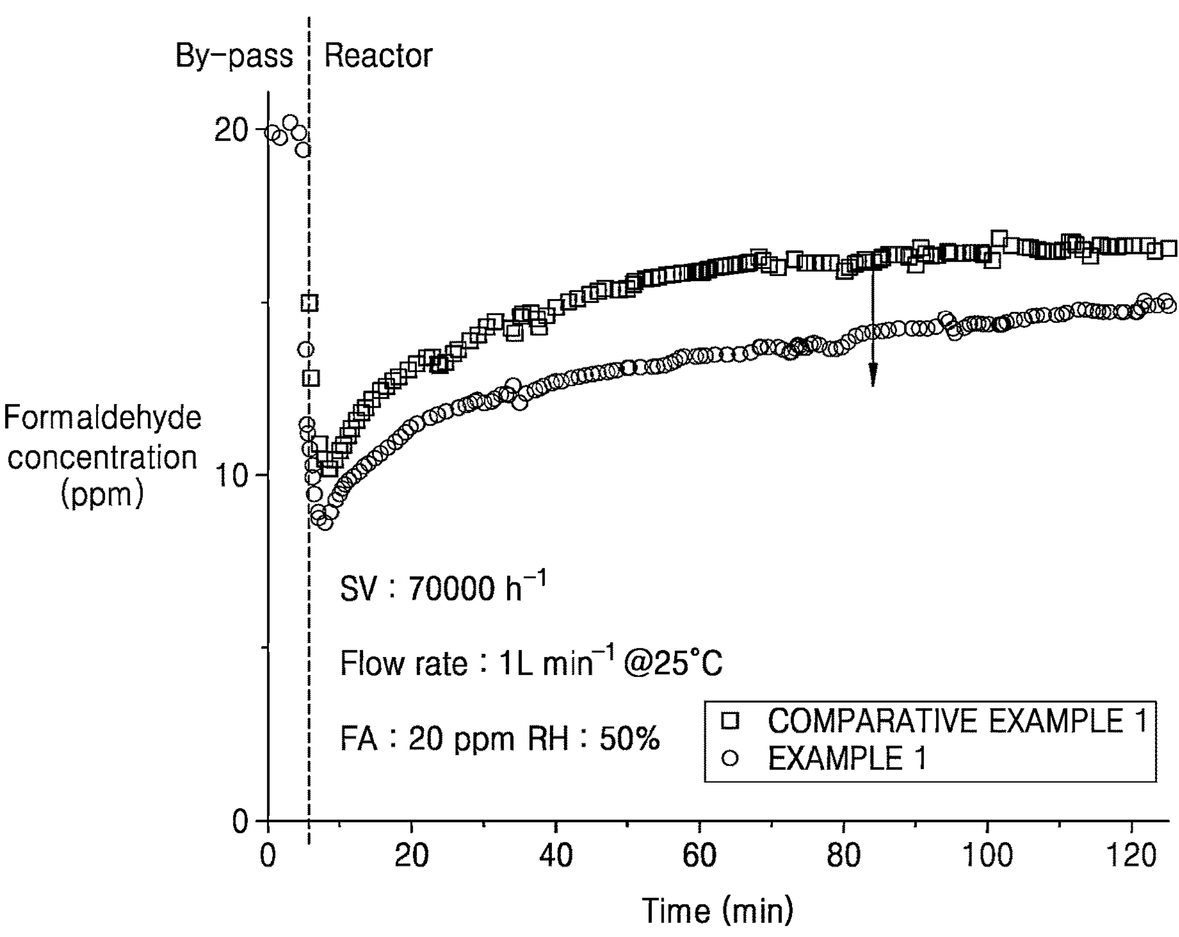
FIG. 5 is a graph of formaldehyde concentration (parts per million, ppm) vs. time (minutes, min) showing formaldehyde adsorption test results of the organic-inorganic composite catalyst prepared in Example 1 and a catalyst prepared in Comparative Example 1.

Despite the reduction of the specific surface area in the organic-inorganic composite catalyst of Example 1, as shown in FIG. 5, the removal amount of formaldehyde was rather increased by the deposition of ethylene urea and manganese oxides.

Evaluation Example 5: Determination of Formaldehyde Removal Amount of Organic-Inorganic Composite Catalyst (I)

In the air purification devices manufactured in Examples 7 to 12 and Comparative Examples 5 to 8, air containing formaldehyde as a second compound was supplied through the inlet, passed through a reaction chamber including a filter, and discharged through the outlet. The content of formaldehyde at the outlet was measured over time. Some of the measurement results are shown in FIG. 5. For measurement, the flow rate of air containing formaldehyde used was 1 liter per minute (L/min), the formaldehyde content was 20 ppm, the relative humidity was 50%, the temperature was 25° C., and the space velocity was 70000 $h^{-1}$.

As shown in FIG. 5, initially, air including formaldehyde supplied through the inlet was supplied to the outlet through the bypass path without a filter, and thus, the formaldehyde content of the air discharged through the outlet was maintained at 20 ppm. Then, by changing the path of the air flow, the air including formaldehyde supplied through the inlet passed through the reaction chamber including the filter and was supplied to the outlet, and thus, the formaldehyde content of the air discharged through the outlet rapidly decreased, followed by slightly increasing profile with time. Air was supplied through the bypass path for the initial 5 minutes, and then air was supplied through the reaction chamber until 120 minutes elapsed.

As shown in FIG. 5, the organic-inorganic composite catalyst of Example 1 showed an increase in the removal amount of formaldehyde, as compared with the activated carbon of Comparative Example 1.

The removal amounts measured in the air purification devices of Examples 7 to 12 and Comparative Examples 5 to 8 are shown in Table 1. The removal amount of formaldehyde is the content of formaldehyde removed relative to the total weight of the organic-inorganic composite catalyst.

TABLE 1

| Used catalyst | Removal amount of formaldehyde [wt %] |
|---|---|
| Example 1 | 0.33 |
| Example 2 | 0.28 |
| Example 3 | 0.33 |
| Example 4 | 0.31 |
| Example 5 | 0.37 |
| Example 6 | 0.36 |
| Comparative Example 1 | 0.20 |
| Comparative Example 2 | 0.24 |
| Comparative Example 3 | 0.27 |
| Comparative Example 4 | 0.22 |

As shown in Table 1, the organic-inorganic composite catalyst prepared in Examples 1 to 6 improved the removal amount of formaldehyde, as compared with the composite catalyst of Comparative Examples 1 to 4.

For example, the organic-inorganic composite catalyst prepared in Example 1 increased the removal amount of formaldehyde by 65%, as compared with the activated carbon of Comparative Example 1.

The organic-inorganic composite catalyst prepared in Comparative Example 2 increased the removal amount of formaldehyde by 20%, as compared with the activated carbon of Comparative Example 1.

The organic-inorganic composite catalyst prepared in Comparative Example 3 increased the removal amount of formaldehyde by 35%, as compared with the activated carbon of Comparative Example 1.

The increase in the removal amount of formaldehyde of the organic-inorganic composite catalyst of Example 1 was further increased, as compared with the total increase of the removal amount of formaldehyde of each of the composite catalysts of Comparative Examples 2 and 3, which is 55%

The organic-inorganic composite catalyst of Example 1 increased the removal amount of formaldehyde, as compared with the catalyst containing a precious metal of Comparative Example 4.

Evaluation Example 6: Determination of Formaldehyde Removal Amount of Organic-Inorganic Composite Catalyst (II)

Figure 6:
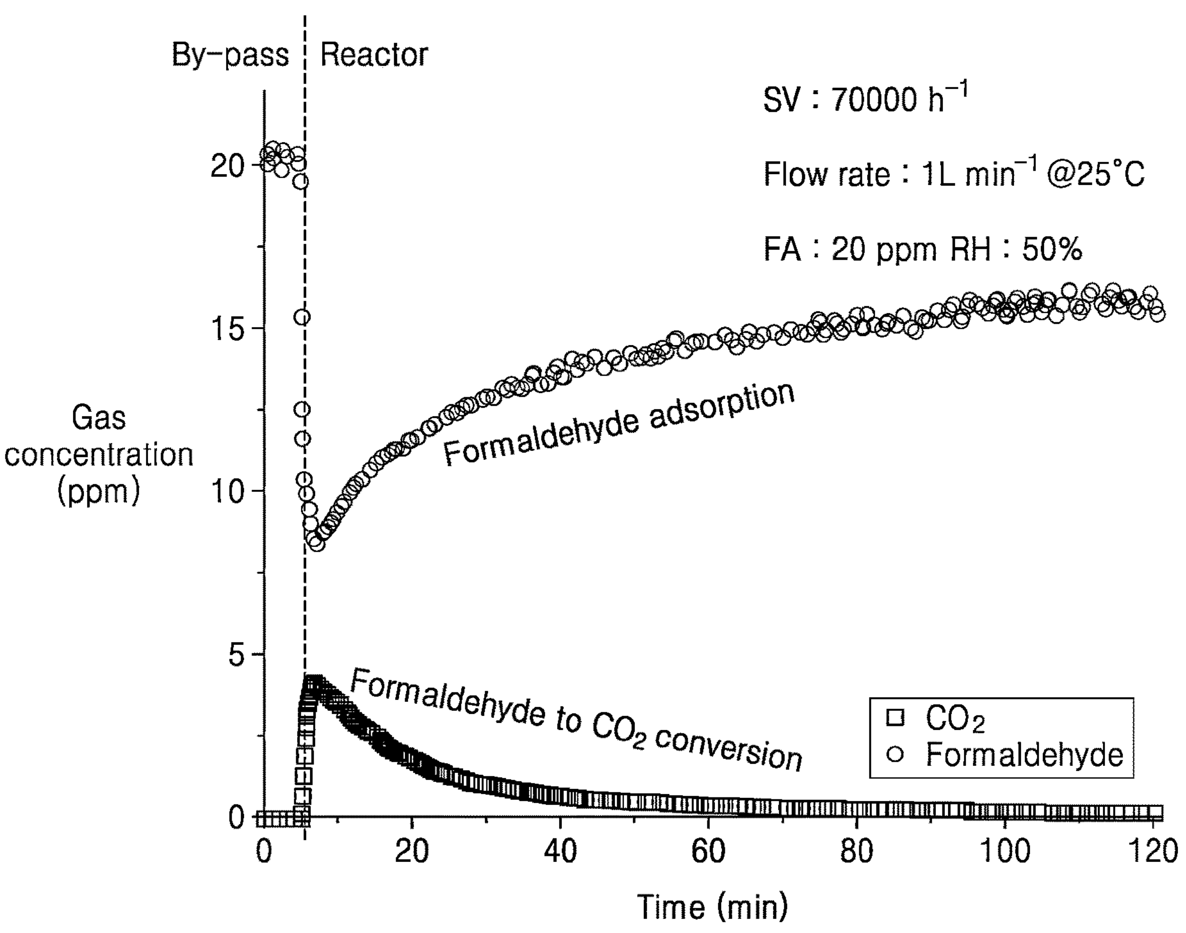
FIG. 6 is a graph of gas concentration (ppm) vs. time (min) showing formaldehyde adsorption and decomposition test results of the organic-inorganic composite catalyst prepared in Example 1.

In the air purification device manufactured in Example 7, air containing formaldehyde as a second compound was supplied through the inlet, passed through a reaction chamber including a filter, and discharged through the outlet. The content of formaldehyde and carbon dioxide at the outlet were measured over time. Some of the measurement results are shown in FIG. 6. For measurement, the flow rate of air containing formaldehyde used was 1 L/min, the formaldehyde content was 20 ppm, the relative humidity was 50%, the temperature was 25° C., and the space velocity was 70000 $h^{-1}$.

As shown in FIG. 6, while the formaldehyde content decreased and increased again, the carbon dioxide content increased and then decreased again.

The description for the decreased formaldehyde content is the same as in Evaluation Example 5, and the increased carbon dioxide content was determined to be converted into carbon dioxide by catalyst reaction when formaldehyde came into contact with manganese oxide.

In the organic-inorganic composite catalyst of Example 1, formaldehyde was adsorbed into ethylene urea, and at the same time, formaldehyde was decomposed into carbon dioxide by manganese oxide.

Therefore, it was confirmed that the organic-inorganic composite catalyst of Example 1 may simultaneously perform formaldehyde adsorption and formaldehyde decomposition at room temperature.

Evaluation Example 7: Regeneration of Composite Catalyst and Determination of Formaldehyde Removal Amount of Regenerated Organic-Inorganic Composite Catalyst (I)

For the organic-inorganic composite catalyst of Example 1, after completing the test of Evaluation Example 5, air free of formaldehyde was supplied for 20 minutes at a temperature of 25° C. for 25 minutes to first wash the organic-inorganic composite catalyst.

Then, the temperature of the air was raised from 25° C. to 160° C. for 30 minutes, and then the organic-inorganic composite catalyst was heat-treated while maintaining at 160° C. for 1 hour.

Upon heat-treatment, the flow rate of air was 1 L/min, the relative humidity was 50%, and the space velocity was 70000 $h^{-1}$.

Then, air free of formaldehyde was supplied at a temperature of 25° C. for 25 minutes, and the composite catalyst was second washed to prepare a regenerated organic-inorganic composite catalyst.

Figure 7:
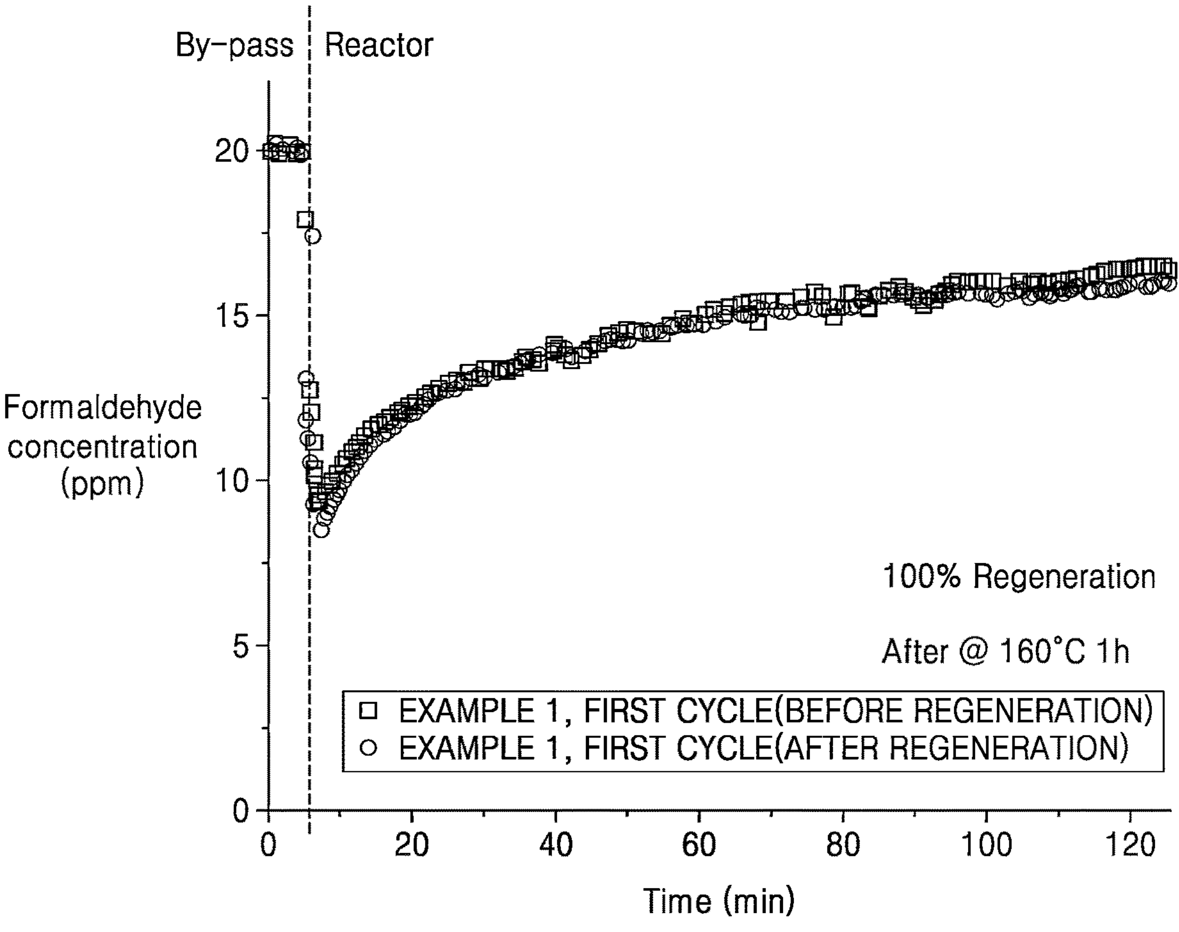
FIG. 7 is a graph of formaldehyde concentration (ppm) vs. time (min) showing products emitted during a heat-treatment of the organic-inorganic composite catalyst prepared in Example 1 and an inorganic composite catalyst prepared in Comparative Example 4.

For the regenerated organic-inorganic composite catalyst, the removal amount of formaldehyde was measured under the same conditions as in Evaluation Example 5, and the results are shown in FIG. 7.

In FIG. 7, the hollow square represents the formaldehyde adsorption profile for the bare organic-inorganic composite catalyst measured in Evaluation Example 5, and the hollow circle represents the formaldehyde adsorption profile for the regenerated organic-inorganic composite catalyst.

As shown in FIG. 7, the adsorption profile of the regenerated organic-inorganic composite catalyst was almost identical to that of the bare organic-inorganic composite catalyst.

Thus, the regenerated organic-inorganic composite catalyst was found to have formaldehyde removal capability similar with the bare organic-inorganic composite catalyst.

Evaluation Example 8: Regeneration of Composite Catalyst and Measurement of Compounds Released During Regeneration For the organic-inorganic composite catalyst of Example 1 and the inorganic composite catalyst of Comparative Example 4, regenerated composite catalysts were prepared by performing the first washing, heat-treating, and second washing in the same manner as in Evaluation Example 7.

Figure 8:
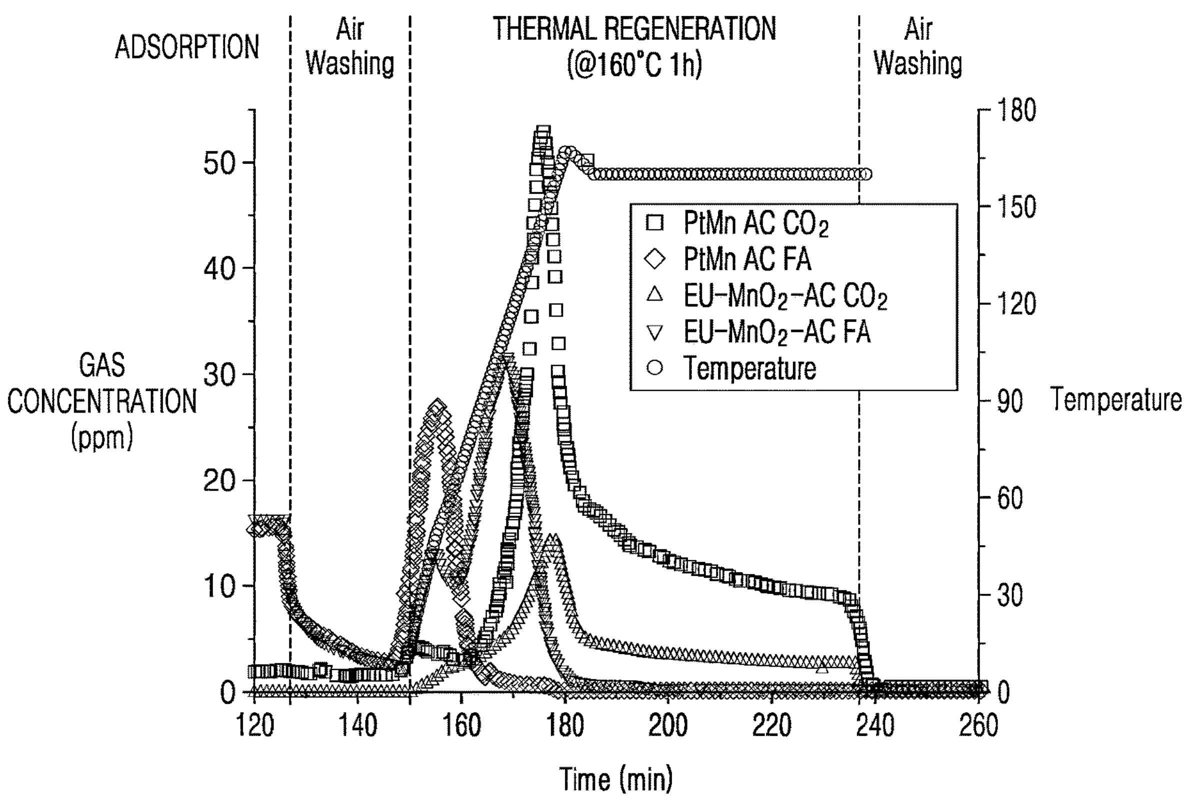
FIG. 8 is a graph of gas concentration (ppm) vs. time (min) showing adsorption test results of the organic-inorganic composite catalyst prepared in Example 1 and the regenerated organic-inorganic composite catalyst.

In the first washing, heat-treating, and second washing, the change in the concentration of the release detected at the outlet of the air purification device is shown in FIG. 8.

As shown in FIG. 8, in the case of the organic-inorganic composite catalyst of Example 1, after the formaldehyde content decreased in the first washing, a bimodal formaldehyde peak was observed by increasing the temperature in the heat-treating, and subsequently, as the temperature further increased, a carbon dioxide peak was observed. The formaldehyde peak was judged to be due to the desorption of formaldehyde from the organic-inorganic composite catalyst. The carbon dioxide peak was determined to be due to thermal decomposition of formaldehyde by metal oxide. In the organic-inorganic composite catalyst of Example 1, the size of the formaldehyde peak was larger than that of the carbon dioxide peak. Therefore, in the organic-inorganic composite catalyst of Example 1, among the adsorbed formaldehyde, the content of formaldehyde desorbed from the organic-inorganic composite catalyst was greater than that of formalin that was thermally decomposed.

In the case of the inorganic composite catalyst of Example 4, after the formaldehyde content decreased in the first washing, a formaldehyde peak was observed by increasing the temperature in the heat-treating, and subsequently, as the temperature further increased, a carbon dioxide peak was observed. In the inorganic composite catalyst of Comparative Example 4, the carbon dioxide peak was significantly larger than that of the formaldehyde peak. Therefore, in the inorganic composite catalyst of Comparative Example 4, among the adsorbed formaldehyde, the content of pyrolyzed formaldehyde was significantly greater than that of formaldehyde desorbed from the inorganic composite catalyst.

Evaluation Example 9: Regeneration of Organic-Inorganic Composite Catalyst and Determination of Formaldehyde Adsorption Amount of Regenerated Organic-Inorganic Composite Catalyst (II)

For the regenerated organic-inorganic composite catalyst of Example 1 and the regenerated inorganic composite catalyst of Comparative Example 4 in Evaluation Example 7, the removal amount of formaldehyde was measured in the same manner as in Evaluation Example 5.

The recovery ratio was measured using the measured formaldehyde removal amount for the bare organic-inorganic composite catalyst of Example 1 and the bare inorganic composite catalyst of Comparative Example 4 in Evaluation Example 5.

The recovery ratio of adsorption amount was calculated by Equation 1 below. The second compound was formaldehyde.

Removal recovery ratio ($B/A$)=(removal amount of the second compound of regenerated organic-inorganic composite catalyst ($B$)/removal amount of the second compound of a non-regenerated (e.g., bare) organic-inorganic composite catalyst ($A$))×100% Equation 1

TABLE 2

| | Removal recovery ratio [%] |
|---|---|
| Example 1 | 101 |
| Comparative Example 4 | 102 |

As shown in Table 2, the removal recovery ratio of the regenerated organic-inorganic composite catalyst of Example 1 was more than 100%, which was very high, similar to that of the composite catalyst including precious metal catalyst of Comparative Example 4.

Therefore, it was confirmed that the organic-inorganic composite catalyst of Example 1 may easily regenerate the formaldehyde removal effect by heat-treatment at a temperature of 200° C. or less.

As apparent from the foregoing description, the organic-inorganic composite catalyst simultaneously includes porous carbonaceous particles, a first compound, and metal oxide particles, and thus, the removal capability for polar compounds is improved, and the organic-inorganic composite catalyst may be easily regenerated.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An organic-inorganic composite catalyst comprising:

a porous carbonaceous particle;

a first compound; and a metal oxide particle, wherein the first compound and the metal oxide particle are supported on the porous carbonaceous particle, the first compound comprises a polar functional group selected from an amine group, a polymer containing an amine group, an amide group, a polymer containing an amide group, an imide group, a polymer containing an imide group, or a combination thereof, the metal oxide is represented by the formula $M_aO_b$, wherein 0<a≤4, 0<b≤5, and M is a metal of Groups 2 to 16 of the Periodic Table of Elements, or a combination thereof, and the organic-inorganic composite catalyst is configured to remove a second compound from an unpurified air flow comprising the second compound.

2. The organic-inorganic composite catalyst of claim 1, wherein the second compound is adsorbed to the organic-inorganic composite catalyst at a first temperature and desorbed from the organic-inorganic composite catalyst at a second temperature, the second temperature is greater than the first temperature, and a boiling point or a decomposition temperature of the first compound is greater than the second temperature, and the first temperature is 50° C. or less, the second temperature is in a range of about 100° C. to about 300° C., and the boiling point or the decomposition temperature of the first compound is about 110° C. or greater.

3. The organic-inorganic composite catalyst of claim 1, further comprising a metabisulfite ion, a sulfite ion, a sulfate ion, or a combination thereof.

4. The organic-inorganic composite catalyst of claim 1, wherein the first compound comprises ethylene urea, urea, sodium metabisulfite, poly(m-xylene adipamide), poly(ethylene terephthalate), iodide, tetrabromoethane, isopropyl iodide, or a combination thereof.

5. The organic-inorganic composite catalyst of claim 1, wherein a content of the first compound is in a range of about 0.1 weight percent to about 5 weight percent, based on a total weight of the organic-inorganic composite catalyst, a content of the metal oxide is in a range of about 0.1 weight percent to about 5 weight percent, based on the total weight of the organic-inorganic composite catalyst, and a weight ratio of the first compound to the metal oxide particle is in a range of about 99:1 to about 1:99.

6. The organic-inorganic composite catalyst of claim 1, wherein the metal oxide comprises a metal, and the metal is Mn, Co, Ce, Ti, Al, Fe, Ni, Na, In, Bi, W, Sn, or a combination thereof.

7. The organic-inorganic composite catalyst of claim 1, wherein the metal oxide comprises $MnO_2$, $Co_3O_4$, $CeO_2$, $TiO_2$, $Al_2O_3$, $Fe_2O_3$, NiO, $Mn_3O_4$, $NaInO_2$, $Bi_2WO_6$, $SnO_2$, or a combination thereof, and the metal oxide particle is a primary particle or a secondary particle, and a size of the metal oxide particle is 1 micrometer or less.

8. The organic-inorganic composite catalyst of claim 1, wherein the second compound is an amine compound selected from ammonia, methylamine, dimethylamine, trimethylamine, ethylamine, aniline, or a combination thereof, an aldehyde compound selected from formaldehyde, acetaldehyde, propiolaldehyde, butylaldehyde, or a combination thereof, a ketone compound selected from dimethylketone, methylethylketone, diethylketone, methylpropylketone, dipropylketone, or a combination thereof, an alcohol compound selected from methanol, ethanol, propanol, isopropanol, butanol, pentanol, hexanol, heptanol, or a combination thereof, a sulfur compound selected from hydrogen sulfide, sulfur dioxide, elemental sulfur, or a combination thereof, or a thiol compound selected from methanethiol, ethanethiol, 1-propanethiol, 2-propanethiol, propenethiol, butanethiol, tert-butyl mercaptan, thiophenol, or a combination thereof.

9. The organic-inorganic composite catalyst of claim 1, wherein the porous carbonaceous particle is a non-spherical particle having an aspect ratio of about 2 or greater, and the non-spherical particle comprises a tube-shaped particle, a plate-shaped particle, a needle-shaped particle, a rod-shaped particle, a fibrous particle, or a combination thereof.

10. An air purification device comprising:

a housing; and the organic-inorganic composite catalyst according to claim 1, a regenerated organic-inorganic composite catalyst, or a combination thereof in the housing, wherein the regenerated organic-inorganic composite catalyst is a heat-treatment product of the organic-inorganic composite catalyst comprising the adsorbed second compound.

11. The air purification device of claim 10, wherein a removal recovery ratio of the regenerated organic-inorganic composite catalyst is greater than about 90 percent, and wherein the removal recovery ratio is represented by Equation 1:

Removal recovery ratio=(removal amount of the second compound of the regenerated organic-inorganic composite catalyst/removal amount of the second compound of a non-regenerated organic-inorganic composite catalyst)×100 percent. Equation 1

12. A method of regenerating an organic-inorganic composite catalyst, the method comprising:

providing an organic-inorganic composite catalyst of claim 1, and a second compound adsorbed on the composite catalyst; and heat-treating the organic-inorganic composite catalyst with the adsorbed second compound at a temperature from about 100° C. to about 300° C. for about 1 minute to about 30 hours to regenerate the organic-inorganic composite catalyst.

13. The method of claim 12, wherein the providing of the organic-inorganic composite catalyst comprises:

providing a first composition comprising a solvent, a metal oxide precursor, and the first compound, mixing the porous carbonaceous particle with the first composition to provide a second composition, adding a reducing agent to the second composition to provide a third composition comprising the metal oxide particle, and drying the third composition to obtain the organic-inorganic composite catalyst.

14. An organic-inorganic composite catalyst comprising:

a porous carbonaceous particle;

a first compound; and a metal oxide particle, wherein the first compound and the metal oxide particle are supported on the porous carbonaceous particle, the first compound comprises a polar functional group, an anion, or a combination thereof, the metal oxide is represented by the formula $M_aO_b$, wherein 0<a≤4, 0<b≤5, and M is a metal of Groups 2 to 16 of the Periodic Table of Elements, or a combination thereof, and the organic-inorganic composite catalyst is configured to remove a second compound from an unpurified air flow comprising the second compound, wherein a content of the first compound is in a range of about 0.1 weight percent to about 5 weight percent, based on a total weight of the organic-inorganic composite catalyst, a content of the metal oxide is in a range of about 0.1 weight percent to about 5 weight percent, based on the total weight of the organic-inorganic composite catalyst, and a weight ratio of the first compound to the metal oxide particle is in a range of about 99:1 to about 1:99.

15. The organic-inorganic composite catalyst of claim 14, wherein the metal oxide comprises $MnO_2$, $Co_3O_4$, $CeO_2$, $TiO_2$, $Al_2O_3$, $Fe_2O_3$, NiO, $Mn_3O_4$, $NaInO_2$, $Bi_2WO_6$, $SnO_2$, or a combination thereof.

16. The organic-inorganic composite catalyst of claim 15, wherein the polar functional group comprises an amine group, an amide group, an imide group, an ester group, a halogen group, a carbonyl group, or a combination thereof, and the anion comprises a metabisulfite ion, a sulfite ion, a sulfate ion, or a combination thereof.

17. The organic-inorganic composite catalyst of claim 14, wherein the porous carbonaceous particle is a non-spherical particle having an aspect ratio of about 2 or greater, and the non-spherical particle comprises a tube-shaped particle, a plate-shaped particle, a needle-shaped particle, a rod-shaped particle, a fibrous particle, or a combination thereof.

18. An organic-inorganic composite catalyst comprising:

a porous carbonaceous particle;

a first compound; and a metal oxide particle, wherein the first compound comprises ethylene urea, urea, sodium metabisulfite, poly(m-xylene adipamide), poly (ethylene terephthalate), iodide, tetrabromoethane, isopropyl iodide, or a combination thereof, wherein the first compound and the metal oxide particle are supported on the porous carbonaceous particle, the first compound comprises a polar functional group, an anion, or a combination thereof, the metal oxide is represented by the formula $M_aO_b$, wherein 0<a≤4, 0<b≤5, and M is a metal of Groups 2 to 16 of the Periodic Table of Elements, or a combination thereof, and the organic-inorganic composite catalyst is configured to remove a second compound from an unpurified air flow comprising the second compound.

19. The organic-inorganic composite catalyst of claim 18, wherein the metal oxide comprises $MnO_2$, $Co_3O_4$, $CeO_2$, $TiO_2$, $Al_2O_3$, $Fe_2O_3$, NiO, $Mn_3O_4$, $NaInO_2$, $Bi_2WO_6$, $SnO_2$, or a combination thereof, and the polar functional group comprises an amine group, an amide group, an imide group, an ester group, a halogen group, a carbonyl group, or a combination thereof.

20. The organic-inorganic composite catalyst of claim 19, wherein a content of the first compound is in a range of about 0.1 weight percent to about 5 weight percent, based on a total weight of the organic-inorganic composite catalyst, a content of the metal oxide is in a range of about 0.1 weight percent to about 5 weight percent, based on the total weight of the organic-inorganic composite catalyst, and a weight ratio of the first compound to the metal oxide particle is in a range of about 99:1 to about 1:99.

* * * * *